(12) United States Patent
Ikeda

(10) Patent No.: US 8,528,612 B2
(45) Date of Patent: Sep. 10, 2013

(54) DUAL STRUCTURE TIRE WHEEL AND METHOD FOR INSTALLING IT

(76) Inventor: Kazuhiro Ikeda, Kobeshi (JP)

( * ) Notice: Subject to any disclaimer, the term of this patent is extended or adjusted under 35 U.S.C. 154(b) by 966 days.

(21) Appl. No.: 12/225,853

(22) PCT Filed: Dec. 18, 2007

(86) PCT No.: PCT/JP2007/074778
§ 371 (c)(1),
(2), (4) Date: Sep. 30, 2008

(87) PCT Pub. No.: WO2009/078110
PCT Pub. Date: Jun. 25, 2009

(65) Prior Publication Data
US 2010/0212800 A1     Aug. 26, 2010

(51) Int. Cl.
*B60C 17/02*     (2006.01)

(52) U.S. Cl.
USPC ........ 152/519; 152/340.1; 152/516; 152/517; 152/518; 152/520; 152/521; 152/522

(58) Field of Classification Search
USPC .............. 152/340.1, 516, 517, 518, 519, 520, 152/521, 522
See application file for complete search history.

(56) References Cited

U.S. PATENT DOCUMENTS

| | | | | |
|---|---|---|---|---|
| 2,680,463 A | * | 6/1954 | Khalil | 152/339.1 |
| 2,884,983 A | * | 5/1959 | Cuesta | 152/514 |
| 3,254,692 A | * | 6/1966 | Travers | 152/340.1 |
| 3,844,325 A | * | 10/1974 | Betancourt L. | 152/340.1 |
| 3,982,576 A | | 9/1976 | Replin | |
| 4,318,434 A | * | 3/1982 | Markow | 152/156 |
| 4,922,981 A | * | 5/1990 | Pompier | 152/520 |
| 4,953,291 A | | 9/1990 | Markow | |
| 5,035,273 A | * | 7/1991 | Ruvio | 152/340.1 |
| 5,273,093 A | * | 12/1993 | Newton | 152/340.1 |
| 5,746,850 A | | 5/1998 | Luscher et al. | |
| 2004/0177910 A1 | | 9/2004 | Chen | |

FOREIGN PATENT DOCUMENTS

| | | |
|---|---|---|
| DE | 43 44 524 | 6/1995 |
| EP | 0 707 985 | 4/1996 |
| GB | 1 451 227 | 9/1976 |
| GB | 2 258 195 | 2/1993 |
| JP | 52-007501 | 1/1977 |

(Continued)

*Primary Examiner* — Timothy Kennedy
(74) *Attorney, Agent, or Firm* — Hamre, Schumann, Mueller & Larson, P.C.

(57) ABSTRACT

It is an object of the present invention to provide a useful inner structural supporter type run flat tire having enough structural strength for controlling the steering wheel to some extent when the tire goes flat and having easy structure for installing to the rim wheel. A wheel 10 has a flange 11 with a bead part of a tubeless tire fitted thereto and a container 12 having a diameter smaller than that of the flange 11, and comprises a rim valve for adjusting the air pressure of the tubeless tire, and a second rim valve for adjusting air pressure in an inner tire 20. The inner tire 20 is stored in the container 12. While the inner tire 20 is stored in the container 12, the tubeless tire 30 is fitted to the flange of the tire wheel 10, air is fed into the inner tire 20 via the second rim valve until the air pressure reaches a predetermined value, so the inner tire 20 is inflated inside the tubeless tire 30, and an inner tire is provided as the inner tire in the outer tubeless tire space.

8 Claims, 31 Drawing Sheets

(56) References Cited

FOREIGN PATENT DOCUMENTS

| JP | U60-105209 | 7/1985 |
|----|------------|--------|
| JP | 63-103710 | 5/1988 |
| JP | U03-107305 | 11/1991 |
| JP | 7-276931 | 10/1995 |
| JP | 9-58209 | 3/1997 |
| JP | 2002-13927 | 4/2002 |
| JP | 2002-96613 | 4/2002 |
| JP | 2003-11605 | 1/2003 |
| JP | 2004-330985 | 11/2004 |
| JP | 2005-153678 | 6/2005 |

* cited by examiner

DUAL STRUCTURE TIRE WHEEL AND METHOD FOR INSTALLING IT

TECHNICAL FIELD

The present invention relates to a dual structure tire wheel and a method for installing it. For example, the present invention can be applied to a tire for a vehicle such as a car, a truck and a bus, an airplane, and a special vehicle. Especially, the present invention relates to a tire wheel comprising a dual structure which is useful for controlling the steering wheel of the running vehicle while the tire goes flat and the vehicle is stopped.

BACKGROUND ART

A tubeless tire is used commonly as a tire for an automobile. A basic structure of the tubeless tire is shown as FIG. 31. A pair of side wall 2 covers from both side edges of a tread part 1 to a rim 5, the edge of the side wall 2 is formed as a bead part 3, and the bead part 3 is connected to the rim 5 having a rim valve 4.

It is well-known fact that when the conventional tubeless tire as shown in FIG. 31 goes flat while the vehicle is running, the car body is tilted due to the heavy weight of the vehicle because the air pressure of the tire gets low, and in addition, the control of the steering wheel and the brake operation becomes difficult.

The prior art, in order to solve the above-mentioned problem, uses a run flat tire that can make the automobile drive to some extent even though the tire goes flat. What is called the run flat tire is a tire that can make the vehicle drive to some extent even if the tire goes flat due to the air pressure rapidly dropping unexpectedly.

In the prior art, the following run flat tires are known.

Firstly, the side wall reinforced type run flat tire is known. The thickness of the side wall is reinforced to sustain the weight for a while by the structural strength of the side wall when the tire goes flat.

However, with the side wall reinforced type run flat tire, the side wall is thickening at the sacrifice of the vibration absorption ability to reinforce the structural strength of the side wall, which should be in charge of absorbing the vibration occurred by the road. Therefore, there are faults such as the decrease of the ride comfort, and the disadvantageous effect on the fuel mileage due to increase of the tire weight.

Secondly, the inner structural supporter type run flat tire is known. The inner structural supporter is installed around the rim wheel to sustain the weight for a while by the structural strength of the inner structural supporter when the tire goes flat.

The Japanese laid open patent application Tokkai Hei 07-276931 and the Japanese laid open patent application Tokkai 2002-096613 are known as the prior art of the conventional inner structural supporter type run flat tire. According to the conventional inner structural supporter type run flat tire, the car body will be supported by the inner structural supporter when the tire goes flat, therefore, the diameter of the inner structural supporter should be larger than that of the rim wheel.

The prior art 1 Japanese laid open patent application Tokkai Hei 07-276931

The prior art 2 Japanese laid open patent application Tokkai 2002-096613

DISCLOSURE OF INVENTION

The Problems to be Solved

It is an object of the conventional inner structural supporter type run flat tire that the driver can control the steering wheel to some extent for stopping the running car safely in case the tire goes flat.

However, it is difficult to install the conventional inner structural supporter type run flat tire to the rim wheel.

Even in the case of the conventional common tubeless tire, it is not easy to install it to the rim wheel. In the case of the conventional inner structural supporter type run flat tire, it should be more difficult to install the inner structural supporter to the rim wheel first and then fit the tubeless tire over the rim wheel and the inner structural supporter because the diameter of the inner structural supporter is larger than that of the tubeless tire hole.

It also may be difficult to install the inner structural supporter and the tubeless tire to the rim wheel at the same time before fixing the inner structural supporter to the rim wheel first, and then fix the inner structural supporter to the rim wheel by some means in the tubeless tire space.

According to the Japanese laid open patent application Tokkai Hei 07-276931, the installing method from the start stage that the tubeless tire is not fixed to the rim wheel to the end stage that the inner structural supporter type run flat tire is fixed is not shown at all. In addition, the indicated figures only show the cross sectional view of the upper side of the relationship among the rim wheel, the inner structural supporter and the outer tubeless tire.

Next, the Japanese laid open patent application Tokkai 2002-096613 indicates the problem that it is difficult to install the outer tubeless tire to the rim wheel if the inner structural supporter has already been fixed to the rim wheel. The Japanese laid open patent application Tokkai 2002-096613 indicates that the inner structural supporter is not single body but several parts, and each part consists of an inner portion and an outer portion, the inner portion can be fixed to the rim wheel.

As for the installation method, the Japanese laid open patent application Tokkai 2002-096613 shows that the one edge of the outer tubeless tire is installed to the rim wheel and the other edge is not installed to the rim wheel first, then one part of the inner structural supporter is inserted from a gap between the other edge of the outer tubeless tire and the flange of the rim wheel and is fixed to the rim wheel by somewhat tool, and another part of the inner structural supporter is inserted from another gap by the same way. Finally, all parts are inserted and installed to the rim wheel one after another. All inner structural supporters can be fixed to the rim wheel by the bolt and nut.

However, actually, the outer tubeless tire is installed to the flange of the rim wheel via bead part closely in order to prevent the air leaking out, therefore, there is not enough gap between the flange of the rim wheel and the outer tubeless tire for inserting the inner structural supporter even though the other edge of the outer tubeless tire is not fixed to the rim wheel. If the thin and small inner structural supporter whose size can be inserted into the gap is assumed, such inner structural supporter becomes very thin and small, so the structural strength of such inner structural supporter is not sufficient for actual use. Therefore, apparently, the conventional inner structural supporter type run flat tire shown in the Tokkai 2002-096613 cannot be provided as the useful run flat tire having enough structural strength for controlling the steering wheel to some extent when the tire goes flat.

It is an object of the present invention to provide a useful inner structural supporter type run flat tire having enough structural strength for controlling the steering wheel to some extent when the tire goes flat and having a structure installed to the rim wheel easily.

Means for Solving the Problem

In order to achieve the above-mentioned object, the first invention of a dual structure tire wheel comprises a rim wheel and an outer tubeless tire. The rim wheel comprises a flange; a bead sheet for connecting a bead part of the outer tubeless tire; a well; a container provided as the well, the diameter of the container being smaller than that of the edge of the rim flange; an inner tire contained in the container; a first rim valve for adjusting the air pressure of the outer tubeless tire; a second rim valve for adjusting the air pressure of the inner tire, wherein the bottom part of the inner tire is made of tough and strong rubber material and the shape of the bottom part of the inner tire fits and connects firmly to the shape of a gap around the side wall near bottom level of the container for preventing the inner tire from being disconnected from the well by the centrifugal force caused by the tire rotation.

According to the above-mentioned configuration of the first invention of the dual structure tire wheel, the procedure for installing the inner tire to the rim wheel is established in practical use. During the outer tubeless tire installation, the inner tire is contained in the container, the inner tire does not obstruct the outer tubeless tire installation to the rim wheel, and then the inner tire is inflated in the outer tubeless tire inner space, by this structure, the car weight is supported by the structural strength of the inner tire when the tire goes flat by the accident.

Next, it is preferable that, the material of the inflation portion of the inner tire is a material having plasticity, and the diameter of the inner tire is larger than that of the flange of the rim wheel when the inner tire is inflated in the tubeless tire inner space by inserting the air into the inner tire to the appropriate air pressure via the second rim valve.

Because of the above-mentioned configuration, the diameter of the inner tire becomes larger than that of the rim flange, and when the outer tubeless tire goes flat, the tilt angle of the car body can be controlled by supporting the car body with the inner tire. Therefore the steering wheel can be controlled to some extent. There are several methods for inflating the inner tire. For example, the following 3 methods can be applied.

The first method is the method that the inner tire is made of the flexible and elastic material. When inserting the air into the inner tire, the contracted inner tire will be inflated appropriately.

The second method is the method that the inner tire has a bellows structure where the base sheet is made of flexible and elastic material and the hard plates are patched intermittently for increasing the structural strength. When inserting the air into the inner tire, the folded inner tire will be unfolded and inflated appropriately.

The third method is the method that the inner tire is made of the flexible but the inelastic material such as reinforcement textile materials made of the glass fiber. When inserting the air into the inner tire, the folded inner tire will be unfolded appropriately.

It is preferable that the inner tire material is a material such as rubber, plastic and textile. The combination of these materials and other additives for structural reinforcement are also preferable for the inner tire material.

Next, in order to achieve the above-mentioned object, there is provided a method for installing the dual structure tire wheel to the rim wheel of the present invention, wherein the dual structure tire wheel comprises an outer tubeless tire; a rim wheel comprising a flange; a bead sheet for connecting a bead part of the outer tubeless tire; a container provided as a well, the diameter of the container being smaller than that of the edge of the rim flange; an inner tire contained in the container; a first rim valve for adjusting the air pressure of the outer tubeless tire; and a second rim valve for adjusting the air pressure of the inner tire. The bottom part of the inner tire is made of tough and strong rubber material and the shape of the bottom part of the inner tire fits and connects firmly to the shape of a gap around the side wall near bottom level of the container for preventing the inner tire from being disconnected from the well by the centrifugal force caused by the tire rotation.

The procedure for inserting the air into the inner tire and the outer tubeless tire under the situation that the inner tire has contained in the container and the outer tubeless tire has connected to the bead sheet comprises two procedures. The first procedure is the inner tire air pressure adjusting procedure in which the air is inserted into the inner tire via the second rim valve until the inner tire air pressure reaches the predetermined air pressure. The second procedure is the outer tubeless tire air pressure adjusting procedure in which the air is inserted into the outer tubeless tire via the first rim valve until the outer tubeless tire reaches the predetermined air pressure; by these two procedures, the inner tire can be inflated in the tubeless tire inner space.

According to the method for installing the dual structure tire wheel of the present invention, when the outer tubeless tire is worn, only the outer tubeless tire can be exchanged easily. It is preferable that the procedure for exchanging the outer tubeless tire will be the reverse procedure indicated above. The first procedure, corresponding to the above-mentioned second procedure, is the outer tubeless tire air pressure decreasing procedure in which the air pressure the outer tubeless tire is decreased by releasing the first rim valve. The second procedure, corresponding to the above-mentioned first procedure, is the inner tire air pressure decreasing procedure in which the air pressure is decreased by releasing the second rim valve. The used worn outer tubeless tire can be removed and the new outer tubeless tire can be installed by the above-mentioned installing procedure.

According to the procedure, the air amount inserting into the inner tire can be controlled for inflating the inner tire appropriately for the outer tubeless tire goes flat unexpectedly and the inner tire is exposed to atmospheric pressure and used as the inner structural supporter.

Next, in order to achieve the above-mentioned object, the second invention of a dual structure tire wheel comprises a rim wheel and an outer tubeless tire. The rim wheel comprises a flange; a bead sheet for connecting a bead part of the outer tubeless tire; a well; plural inner plate modules arrayed along to the well bottom where the installation angle to the well bottom can be adjustable and when the installation angle is adjusted as the inner plate modules are set down parallel to the well bottom, the diameter of the inner plate modules being smaller than that of the edge of the rim flange; and a rim valve for adjusting the air pressure of the outer tubeless tire.

When the outer tubeless tire is installed to the bead sheet, the installation angle of the inner plate modules is adjusted so that the inner plate modules are set down parallel to the well bottom. Then the installation angle of the inner plate modules is adjusted so that the inner plate modules are set up against the well bottom in order to increase the diameter of the inner plate modules to be larger than that of the rim flange.

There are a projection shape at one side of the inner plate module and a dent shape at the other side of the inner plate module shape along one direction. The projection shape of one inner plate module corresponds to the dent shape of the neighboring inner plate module in order to lengthen the projection length and to increase the number of the inner plate module.

According to the above-mentioned configuration of the second invention of the dual structure tire wheel, the procedure for installing the inner plate module set up to the rim wheel is established in practical use. During the outer tubeless tire installation, the inner plate modules are set down along the well bottom, and the inner plate modules do not obstruct the outer tubeless tire installation to the rim wheel. Then the inner plate modules are set up against the well bottom in the outer tubeless tire inner space. By this structure, the car weight is supported by the structural strength of the inner plate modules when the tire goes flat unexpectedly.

Next, it is preferable that the inner plate modules have a curve along the rim wheel surface.

When the inner plate modules has such a curve shape along the rim wheel surface, it is possible to shorten the deepness of the contained inner plate modules when the inner plate modules set down along to the rim wheel orderly.

It is preferable that the material of the inner plate modules is a material such as metal, hard plastic or hard rubber. The combination of these materials and other additive for structural reinforcement is also preferable for the inner plate modules.

The dual structure tire wheel of the present invention can be sold as either the tire wheel in which the outer tubeless tire has already been installed or the tire wheel in which the outer tubeless tire has not been installed yet.

BEST MODE FOR CARRYING OUT THE INVENTION

Hereinafter, example for carrying out the present invention will be described by way of embodiments. However, the present invention is not limited to the embodiments.

The dual structure tire wheel of the present invention can be applied to the tire wheel for the vehicle such as the car, the truck, the bus, the airplane, the special purpose vehicle and so on. The tire wheel applied to the car is described in the following embodiments, however, the dual structure of the present invention can be applied to the various vehicles such as the truck, bus, the airplane, the special purpose vehicle and so on.

In the following description, "the wheel" denotes the rim wheel and the inner tire, and "the tire wheel" denotes the whole structure including the wheel and the tubeless tire installed on the wheel.

(Embodiment 1)

The tire wheel of this Embodiment 1 is an example for employing the material having the elasticity as the material for the inner tire and using the method for inflating the inner tire by filling the air (the first method) as the method for inflating the inner tire.

Figure 1:
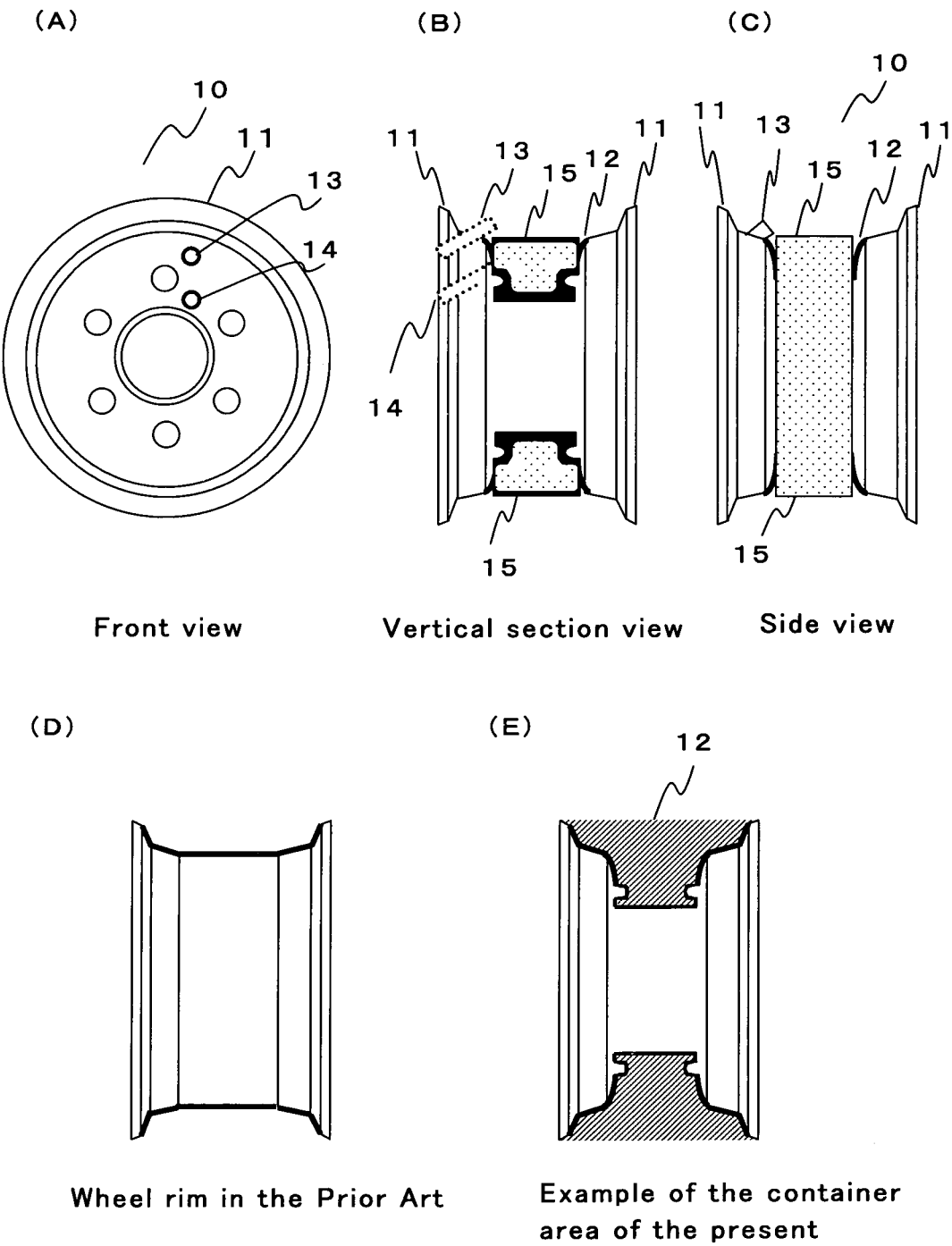
FIG. 1 illustrates a basic structure of the rim wheel of the dual structure tire wheel of the Embodiment 1 according to the present invention.
Figure 2:
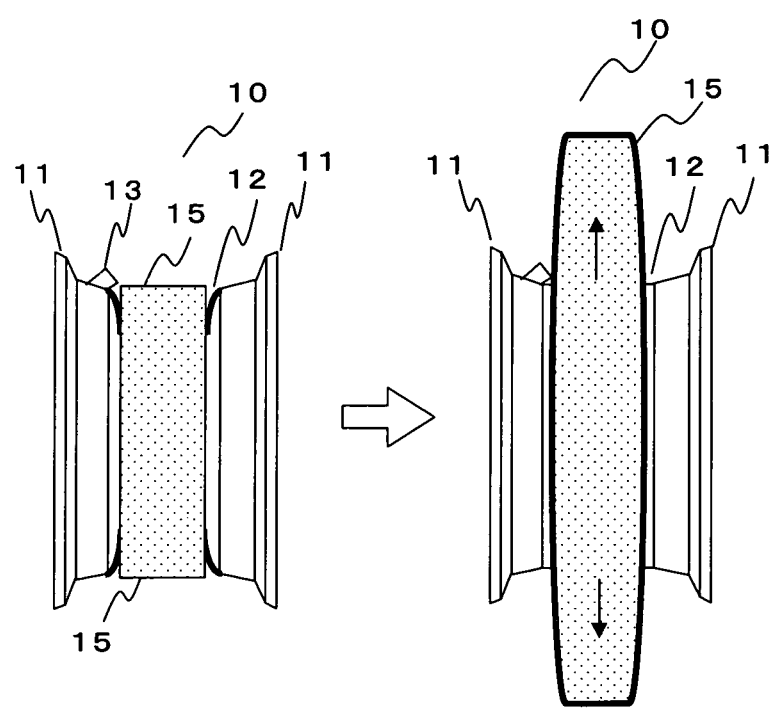
FIG. 2 illustrates a schematic view of the procedure for inflating the inner tire shown in the FIG. 1 of the Embodiment 1.

FIG. 1 illustrates a basic structure of the rim wheel of the dual structure tire wheel, and FIG. 2 illustrates a schematic view of the procedure for inflating the inner tire shown in the FIG. 1. The procedure shown in the following description is an example and the descriptions for the details of the procedure such as the procedure for installing the tubeless tire to the bead of the rim are omitted.

FIG. 1 shows the schematic view of the rim wheel 10 of the dual structure tire wheel of the present invention, FIG. 1 (A) shows a front view, FIG. 1 (B) shows a vertical cross-sectional view, and FIG. 1 (C) shows a side view. FIG. 1 (D) and FIG. 1 (E) show the comparison between the rim wheel of the prior art and the rim wheel of the present invention. The area of the container part 12 is hatched illustratively shown in the FIG. 1 (E).

As shown in FIG. 1 (A) to FIG. 1 (C), the wheel 10 of the present invention comprises a flange 11, a container 12, a first rim valve 13 for adjusting the air pressure of the tubeless tire 30 installed to the wheel 10, a second rim valve 14 for adjusting the air pressure of an inner tire 15 and the inner tire 15. Other elements included in the general wheel are included in the wheel of the present invention. However these are omitted in Figures.

The bead sheet (which is not shown in Figure) is an element for providing the contact part to the inside edges of the tubeless tire 30. It provides a part for installing the bead of the tubeless tire 30.

The container 12 is configured by cutting and digging the bottom part of the well, and the container 12 is provided as the container space for the inner tire 15. The container part 12 is configured by cutting and digging the bottom part of the well, the container space of the rim wheel of the present invention is larger than that of the conventional rim wheel. The area of the container part 12 is hatched. The inner tire 15 is contained in the container 12.

The first rim valve 13 and the second rim valve 14 can be the same configuration of the general conventional rim valve, the detail structure is not shown in the Figures, the air insertion part of the first rim valve 13 is introduced to the position at the inside of the tubeless tire 30 for adjusting the air pressure of the tubeless tire 30, the air insertion part of the second rim valve 14 is introduced to the position at the inside of the inner tire 15 for adjusting the air pressure of the inner tire 15.

The inner tire 15 is made of material which has elasticity and structural strength, and the inner tire 15 has balloon structure, therefore, it can be inflated by containing the gas such as air. As for material, thin reinforced rubber, reinforced plastic, reinforced fiber can be employed, in addition, reinforce additives such as glass fiber or titan can be added for enhancing the structural strength.

The size of the inner tire 15 is suitable for that of the container 12 when the inner tire is in a deflated status. The inner tire 15 is inflated by providing air via the second rim valve 14, and the inner tire 15 assumes the inner structure in the wheel 10.

As the method for attaching and fixing the inner tire 15 to the wheel 10, for example, the bottom part of the inner tire 15 is made of thick reinforced rubber material, and the shape of the bottom part of the inner tire is fitted and fixed for the shape of the bottom and side of the container 12. The inner tire is caught in the bottom part of the container 12, and the inner tire is not separated from the container 12 even if the centrifugal force is applied. By this method, the inner tire 15 in the deflated status is fitted and fixed to the bottom part of the container 12 of the wheel 10 as shown in FIG. 1 (A) to FIG. 1 (C).

FIG. 2 illustrates a schematic view of the procedure for inflating the inner tire.

As shown in the left side in FIG. 2, the inner tire 15 is contained in the container 12 is in the deflated status. The right side in FIG. 2 shows the inner tire 15 in the inflated status by containing the air via the second rim valve. The diameter size of the inner tire 15 in the inflated status is larger than that of the flange 11, and the size of the inner tire is suitable for working as the inner structure of the dual structure tire wheel.

Figure 3:
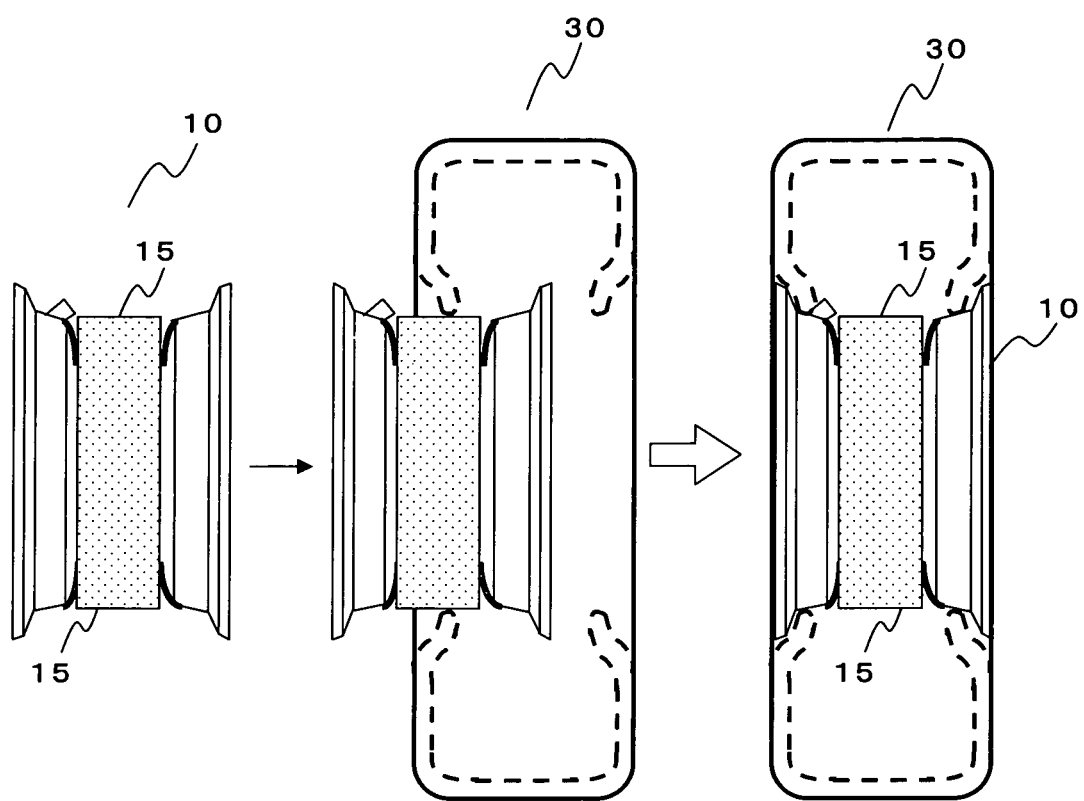
FIG. 3 illustrates a schematic view of the procedure for installing the tubeless tire around the rim wheel of the Embodiment 1.
Figure 4:
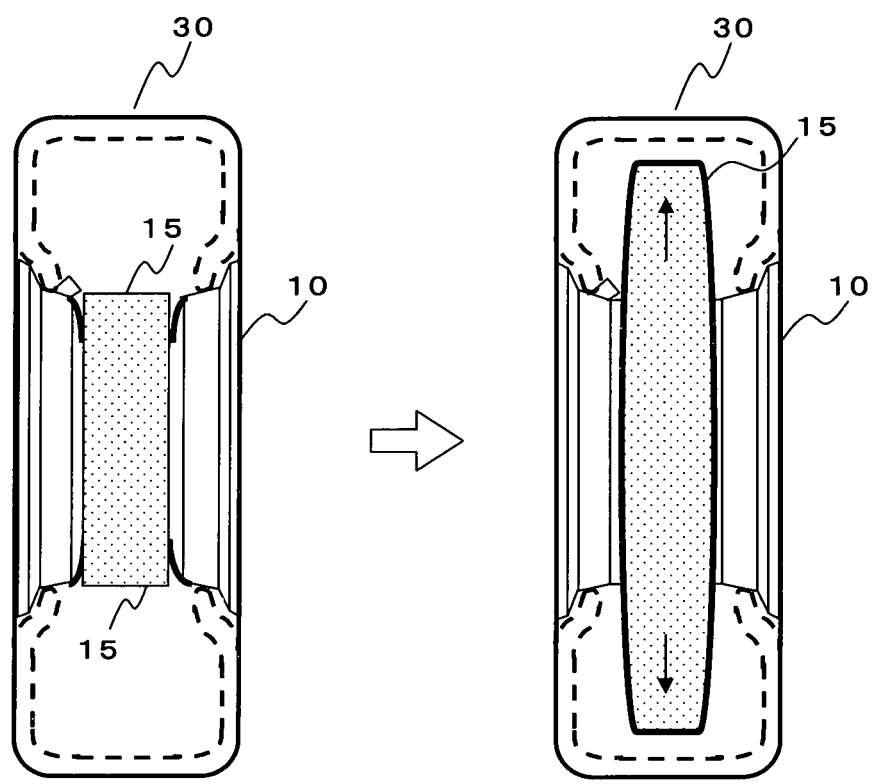
FIG. 4 illustrates a schematic view of the procedure for inflating the inner tire as the inner structure in the tubeless tire space.

FIG. 3 and FIG. 4 illustrate the schematic views of the procedure for installing the tubeless tire around the rim wheel and inflating the inner tire as the inner structure in the tubeless tire space.

In FIG. 3 and FIG. 4, the outline of the tubeless tire 30 is drawn by the solid line, the cross-sectional view is drawn by the dot line. The inner cross-sectional view is shown for explaining the relationship between the wheel 10 and the tubeless tire 30.

First of all, as shown in the left side in FIG. 3, the tubeless tire 30 goes through and covers the wheel 10. The bead part of the tubeless tire 30 (not shown in Figure) is installed to the bead sheet of the wheel 10 (not shown in Figure) by the conventional method (the detailed procedure is not shown in Figure). The shape and the structure of the bead part of the tubeless tire 30 and the bead sheet of the wheel 10 are the same as the conventional bead part and the conventional wheel.

In the left side in FIG. 3, the inner tire 15 is contained in the container 12 in the deflated status. The diameter of the inner tire is smaller than that of the edge of the rim flange, so it does not obstruct the tubeless tire 30 when the tubeless tire 30 goes through and covers the wheel 10. Therefore, the conventional procedure for installing the tubeless tire to the wheel can be applied.

After the tubeless tire 30 goes through and covers the wheel 10, as shown in the right side of FIG. 3, the tubeless tire 30 and the wheel 10 are fitted and fixed closely to each other by the bead part, and the inner space of the tubeless tire 30 is airtight. However, at this moment, the first rim valve 13 is opened, and therefore the air pressure is the same as the atmospheric pressure because the inner space of the tubeless tire 30 is connected to the atmosphere.

Next, as shown from the left side of FIG. 4 to the right side of FIG. 4, the inner tire 15 is inflated and developed in the inner space of the tubeless tire 30 (the first procedure). The inner tire 15 is inflated via the second rim valve 14. The second rim valve 14 connects the outer atmosphere and the inner space of the inner tire 15, the air pressure of the inner space of the inner tire 15 can be adjusted by controlling the air flow and the open/shut of the second rim valve 14. The air pressure of the inner tire 15 is increased via the second rim valve 14, the inner tire 15 is inflated and enlarged in the inner space of the tubeless tire 30. After inflation of the inner tire 15, the second rim valve 14 is shut to be airtight, and therefore, the inflation status of the inner tire 15 can be maintained. The diameter of the inner tire 15 becomes a suitable size for the inner structure of the run flat tire.

Up to this point, the air pressure of the inner space of the tubeless tire 30 is the same as the outer atmosphere pressure because the first rim valve 13 is opened.

Next, the air pressure of the tubeless tire 30 is adjusted. The air pressure of the inner space of the tubeless tire 30 is adjusted via the first rim valve 13. After that, the first rim valve 13 is shut, and the tubeless tire 30 is airtight (the second procedure).

The air is inserted until the inner air pressure of the tubeless tire 30 reaches the predetermined air pressure. The tubeless tire 30 is inflated to the normal status, and the tubeless tire 30 is suitable for driving.

There are the above-mentioned two procedures. The first procedure is adjusting the air pressure of the inner tire 15 up to the predetermined pressure via the second rim valve 14, and the second procedure is adjusting the air pressure of the tubeless tire 30 up to the predetermined pressure via the first rim valve 13. According to these two procedures, the amount of the air to be inserted into the inner tire 15 is controlled for the suitable amount for maintaining the inflation of the inner tire 15 as being the inner structure of the run flat tire when the tubeless tire goes flat.

The reason is as follows. When the outer tubeless tire 30 punctured when driving the car, the air pressure of the tubeless tire 30 is decreased rapidly from the inner predetermined pressure of the tubeless tire to the outer atmosphere pressure. The inner tire 15 is inflated rapidly by its own inner air pressure, and if the strength of the inner tire 15 is insufficient, the inner tire 15 will burst by rapid inflation. According to the first procedure of the above-mentioned 2 procedures, the inner air pressure of the tubeless tire 30 is the outer atmosphere pressure during adjusting the inner air pressure of the inner tire 15 up to the predetermined pressure, therefore, the amount of air contained in the inner tire 15 is suitable for inflating the inner tire under the outer atmosphere pressure.

In the second procedure, the air pressure of the tubeless tire 30 is increased up to the predetermined pressure via the first rim valve 13, the inner tire 15 will be also pressed up to the predetermined pressure and the inner tire 15 will shrink a little. The inner tire 15 is shrunk a little, when the inner pressure of the tubeless tire 30 is decreased rapidly to the outer atmosphere when the tubeless tire 30 is punctured, the inner tire 15 will be inflated by its own inner air pressure and work as the inner structure of the run flat tire.

Figure 5:
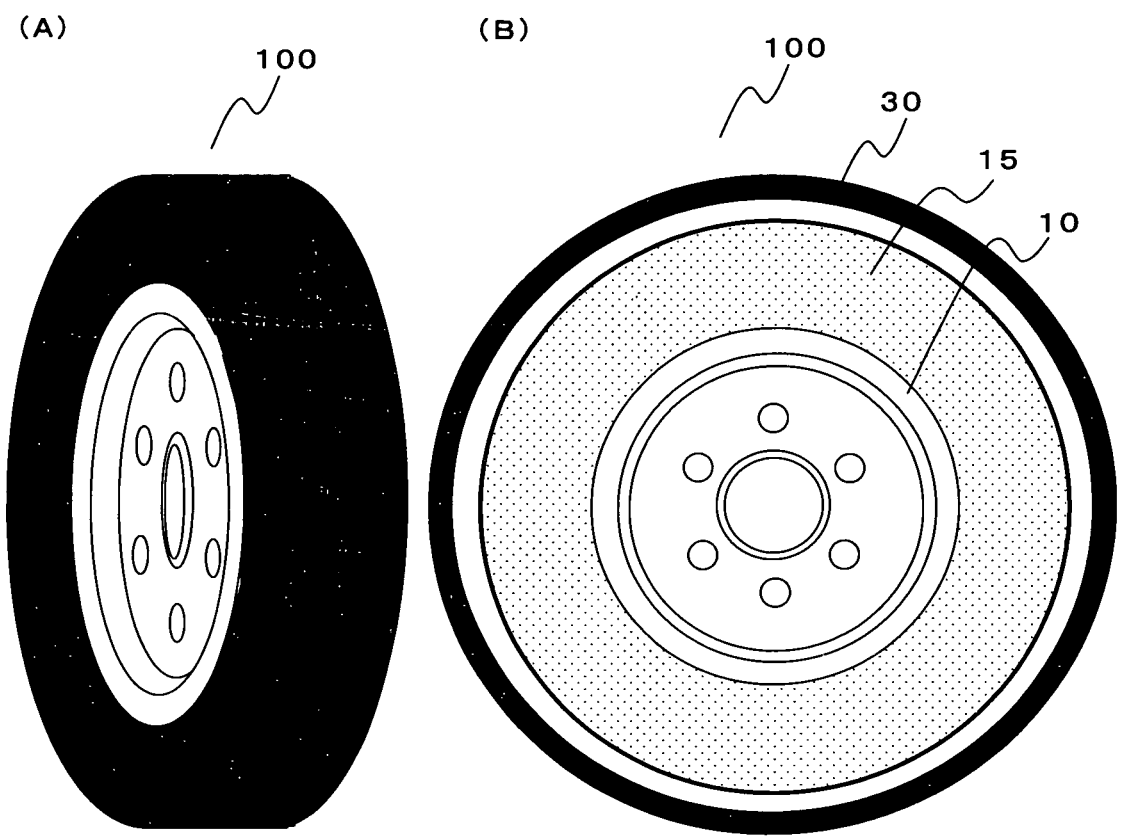
FIG. 5 illustrates a schematic view of the complete dual structure tire wheel of the Embodiment 1.

FIG. 5 illustrates a schematic view of the complete dual structure tire wheel 100 upon inserting the air by the above-mentioned procedures. FIG. 5 (A) is a perspective view, and FIG. 5 (B) shows the cross-sectional view of FIG. 5 (A). As shown in FIG. 5 (B), the inner tire 15 is inflated in the inner space of the tubeless tire 30.

Next, the effect of the present invention when the outer tubeless tire 30 is punctured is explained.

Figure 6:
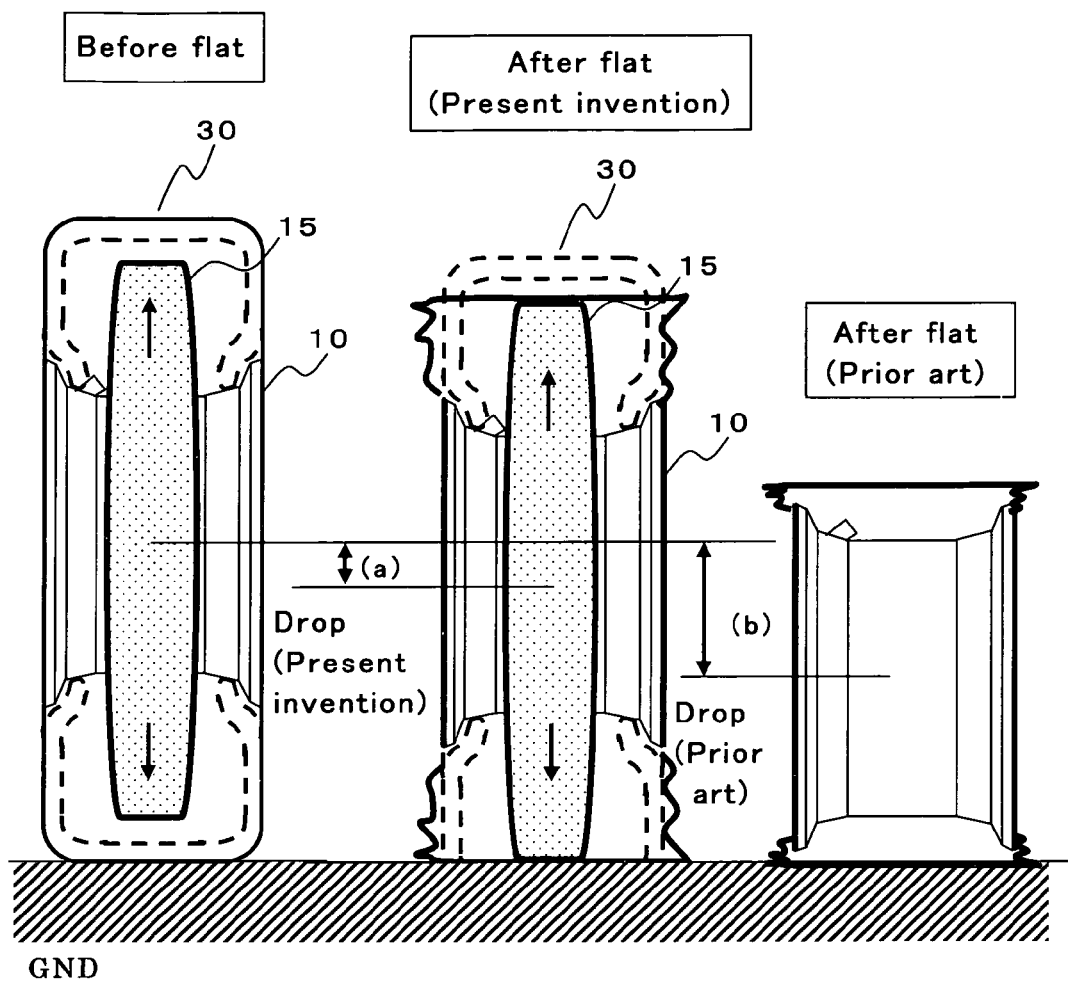
FIG. 6 illustrates a schematic view of the advantageous merit when the dual structure tire wheel of the present invention goes flat.

The left side of FIG. 6 illustrates a schematic view when the tubeless tire 30 is in the normal status, the right side of FIG. 6 illustrates a schematic view when the conventional tubeless tire is punctured, and the center of FIG. 6 illustrates a schematic view when the tubeless tire 30 of the present invention is punctured.

When the tubeless tire 30 is punctured, the tubeless tire 30 is burst and the car body falls down to some extent because the tubeless tire 30 cannot sustain the weight. Therefore the handling becomes difficult and the danger level increases. In the case of the conventional tire wheel, the car body falls down in a moment from the status shown in the left side of the FIG. 6 to the status shown in the right side of the FIG. 6. In the case of the conventional tire wheel, the car body falls down a height of "b" in a moment, so the danger level is high. To the contrary, in the case of the present invention, the car body is sustained temporarily by the inner tire 15, the car body falls down in a moment from the status shown in the left side of the FIG. 6 to the status shown in the center of the FIG. 6. In the case of the present invention, the car body falls down a height of "a" in a moment. Comparing the height that the car body falls down at the puncture, it is obvious that the tire wheel of the present invention is safer than the conventional tire wheel because the conventional tire wheel falls down a height of "b" and the tire wheel of the present invention falls down a height of "a", so the height dropped becomes small.

The structural strength of the inner tire 15 required when the tire is punctured is explained as follows. When the outer tubeless tire 30 is punctured, it is not stripped away in a moment and it remains around the wheel temporarily. In this status, the inner tire 15 works as a tube for the outer tubeless tire 30. In short, the inner tire 15 works as the tube temporarily. Therefore, the car can keep on running for a while until the car stops as if it still has the tubeless tires by the outer tubeless tire 30 and the inner tire 15. The dual structure tire wheel of the present invention aims at this effect.

Next, the procedure for exchanging the tire is explained as follows. According to the present invention, when the outer tubeless tire 30 has worn, only the outer tubeless tire 30 can be exchanged. To the contrary, according to the conventional run flat tire, when the outer tubeless tire 30 has worn, the whole tire wheel should be exchanged. In short, the outer tubeless tire 30 and the inner tire 15 are separated, so the outer tubeless tire 30 can be exchanged independently.

Figure 7:
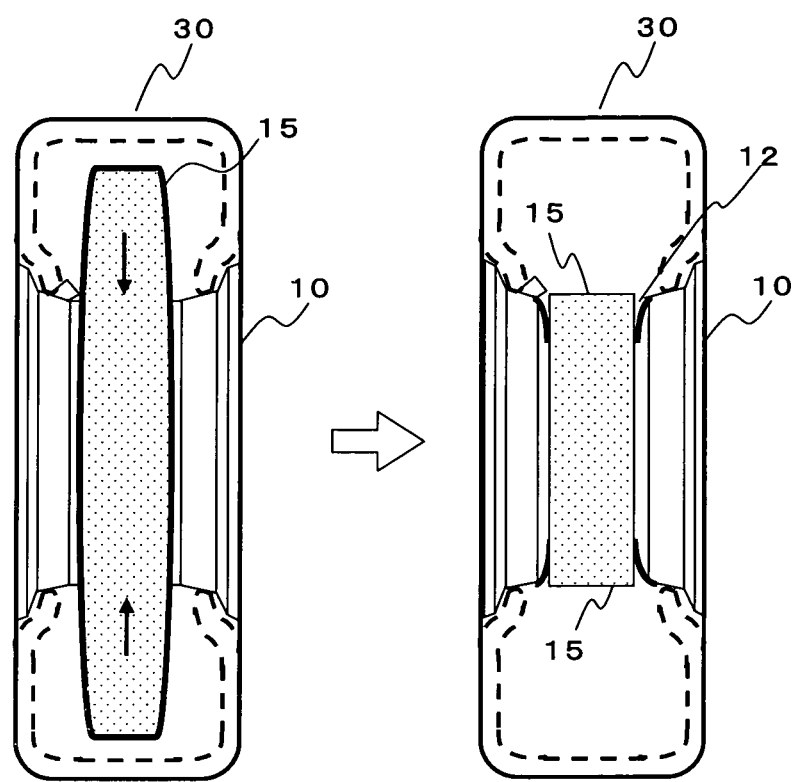
FIG. 7 illustrates a schematic view of the procedure for shrinking the inner tire in the tubeless tire space.

In the first procedure of the outer tubeless tire exchange, as shown in FIG. 7, the air in the inner tire 15 is removed by releasing the second rim valve 14, and the inner tire 15 is shrunk. The inner tire 15 can be contained in the container 12. Next, the air in the outer tubeless tire 30 is removed by releasing the first rim valve.

Figure 8:
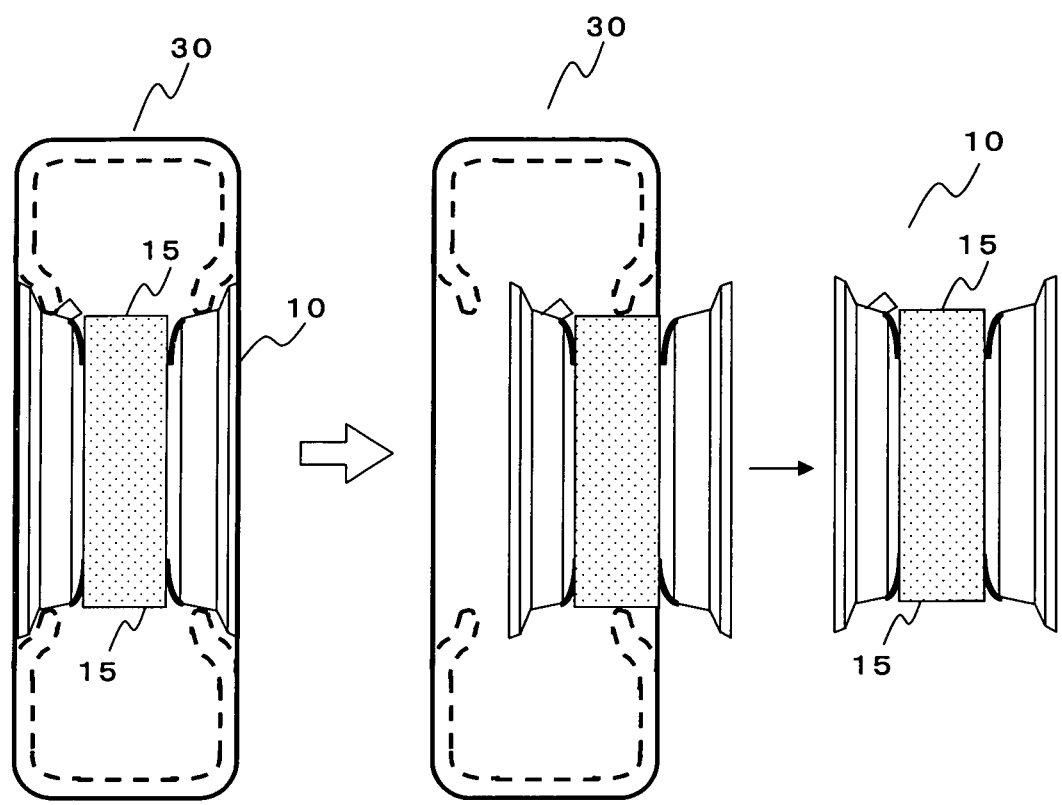
FIG. 8 illustrates a schematic view of the procedure for removing the tubeless tire from the rim wheel.

Next, in the second procedure of the outer tubeless tire exchange, as shown in FIG. 8, the outer tubeless tire 30 is separated by disconnecting the bead part from the bead sheet of the wheel, and the tubeless tire 30 can be removed from the wheel 10. During this procedure, the inner tire 15 is shrunk and the inner tire 15 is not an obstacle to pulling out the wheel because the diameter of the inner tire 15 becomes small.

By these two procedures, the outer tubeless tire 30 can be removed from the inner tire 15 and exchanged. Then the new tubeless tire 30 can be installed according to the FIG. 3 and FIG. 4.

The configuration of the dual structure tire wheel of Embodiment 1 of the present invention is shown as above, the configuration is only one example, and the configuration of the present invention can be modified in various designs.

(Embodiment 2)

The configuration of the dual structure tire wheel of the Embodiment 2 is a configuration that employs a hard material such as hard rubber intermittently on the inner tire whose material has elasticity, and the inner tire 15 can be folded as bellows, and the method for inflating the inner tire by inserting air is employed.

Figure 9:
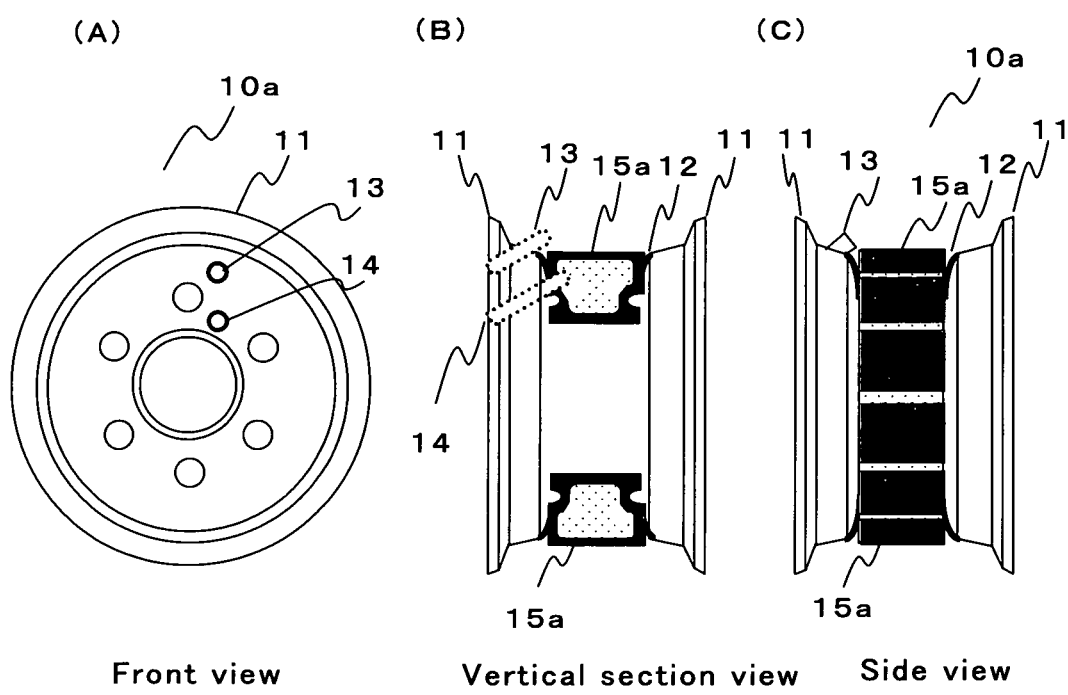
FIG. 9 illustrates a basic structure of the rim wheel of the dual structure tire wheel of the Embodiment 2 according to the present invention.
Figure 10:
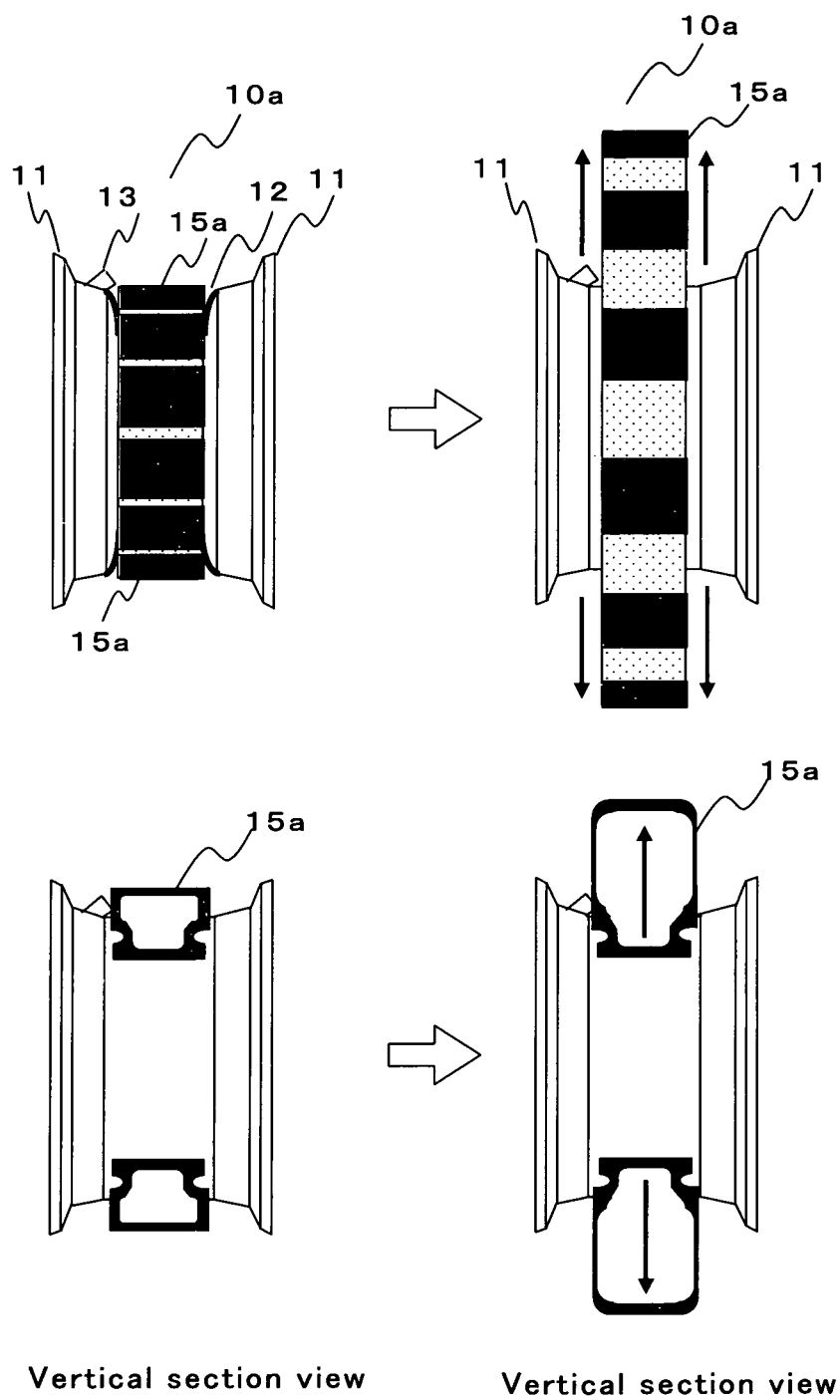
FIG. 10 illustrates a schematic view of the procedure for inflating the inner tire shown in the FIG. 9 of the Embodiment 2.

FIG. 9 illustrates a basic structure of the rim wheel of the dual structure tire wheel of the Embodiment 2, and FIG. 10 illustrates a schematic view of the procedure for inflating the inner tire shown in the FIG. 9. The installing procedure shown in the following description is an example and the description for the detailed procedures such as procedure for attaching the bead sheet are omitted.

FIG. 9 shows a schematic view of the rim wheel 10a of the dual structure tire wheel of the present invention. FIG. 9 (A) shows a front view, FIG. 9 (B) shows a vertical cross-sectional view, and FIG. 9 (C) shows a side view. The area of the container part 12 of the rim wheel of Embodiment 2 is the same as that of Embodiment 1, so a Figure corresponding to FIG. 1 (E) is omitted here.

As shown in FIG. 9 (A) to FIG. 9 (C), the wheel 10a of Embodiment 2 comprises a flange 11, a container 12, a first rim valve 13 for adjusting the air pressure of the tubeless tire 30 installed to the wheel 10a, a second rim valve 14 for adjusting the air pressure of the inner tire 15a and an inner tire 15a as in Embodiment 1. The function and the structure of the flange 11, the container 12, the first rim valve 13 and the second rim valve 14 are the same as those shown in Embodiment 1. Other elements included in the general wheel are included in the wheel of the present invention, however these are omitted in the Figures.

The inner tire 15a of the Embodiment 2 employs the hard material such as hard rubber intermittently on the its surface of a material that has elasticity. The inner tire 15a is made of soft rubber material that has elasticity, it can be inflated by air as shown in Embodiment 1. However, the inner tire 15a has the hard material such as hard rubber intermittently on its surface. As shown in FIG. 9(C), there are soft rubber material areas between the hard materials, these areas made of such soft rubber material have elasticity and can be folded, so the inner tire 15a can work as a bellows.

In addition, the strength of the inner tire 15a is enhanced because it employs the hard material such as hard rubber on the surface.

When the inner tire 15a is in the deflated status, it can be contained in the container 12, and when the inner tire 15a is in the inflated status by air insertion via the second rim valve 14, it can work as the inner structure of the dual structure tire wheel.

As for the method for attaching and fixing the inner tire 15a to the wheel 10a, the same as in Embodiment 1, as shown in FIG. 9(B), the bottom part of the inner tire 15a is made of thick reinforced rubber material, and the shape of the bottom part of the inner tire 15a is fitted and fixed for the shape of the bottom and side of the container 12, the inner tire is caught in the bottom part of the container 12, and the inner tire is not separated from the container 12 even if centrifugal force is applied.

FIG. 10 illustrates a schematic view of the procedure for inflating the inner tire 15a.

As shown in the left side of FIG. 10, the inner tire 15a is contained in the container part 12 in the deflated status. The right side of FIG. 10 shows the inner tire 15a in the inflated status by air insertion via the second rim valve 14. For the inner tire 15a in the inflated status, the diameter is larger than that of the edge of the flange 11, and it can work as the inner structure of the dual structure tire wheel.

Figure 11:
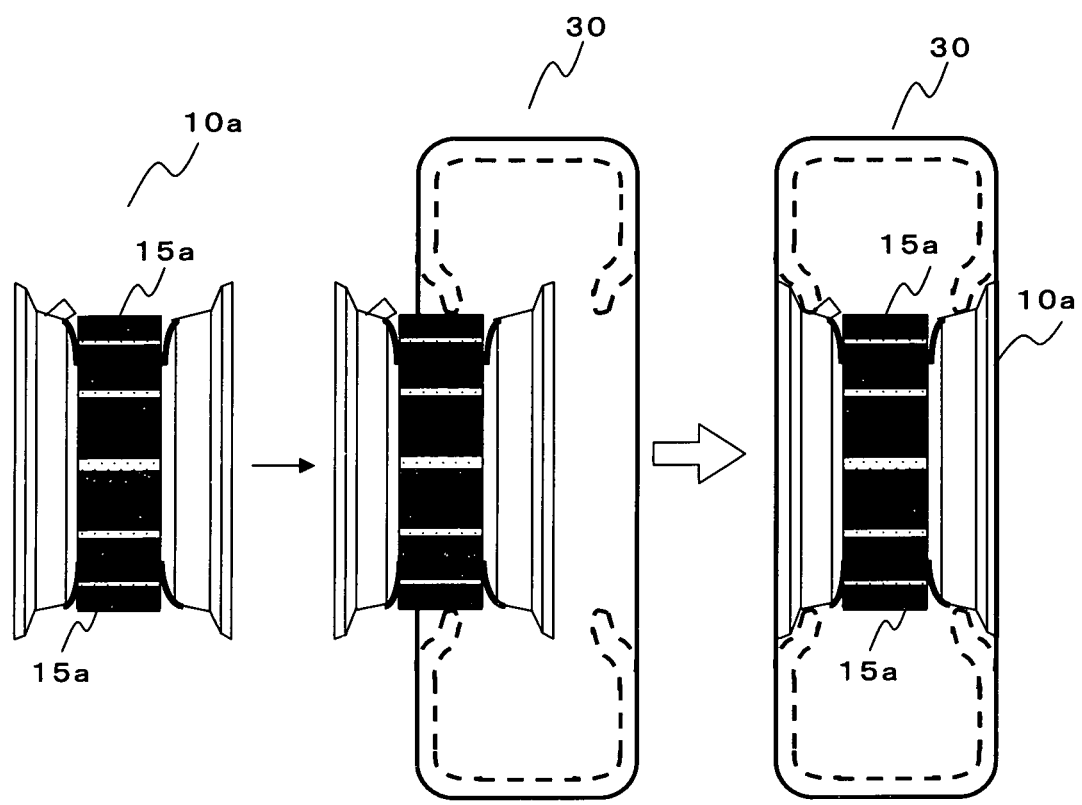
FIG. 11 illustrates a schematic view of the procedure for installing the tubeless tire around the rim wheel of the Embodiment 2.
Figure 12:
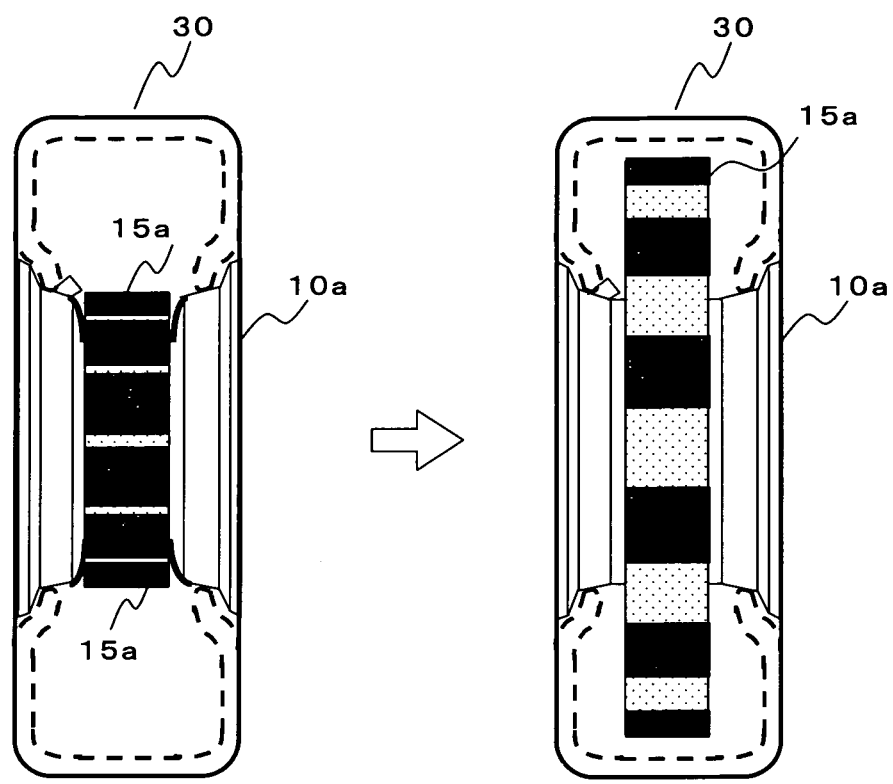
FIG. 12 illustrates a schematic view of the procedure for inflating the inner tire as the inner structure in the tubeless tire space.

FIG. 11 and FIG. 12 illustrate the schematic views of the procedure for installing the tubeless tire 30 around the rim wheel 10a and working as the inner structure for the dual structure tire wheel. First, as shown from the left side of FIG. 11 to the right side of FIG. 11, the tubeless tire 30 goes through and covers the wheel 10.

The bead part of the tubeless tire 30 (not shown in Figure) is installed to the bead sheet of the wheel 10a (not shown in Figure) by the conventional method (the detailed procedure is not shown in Figure). The inner tire 15a is contained in the container 12 in the deflated status, and the diameter of the inner tire is smaller than that of the edge of the rim flange, so it does not obstruct the tubeless tire 30 when the tubeless tire 30 goes through and covers the wheel 10a. Therefore, the conventional procedure for installing the tubeless tire to the wheel can be applied.

After the tubeless tire 30 goes through and covers the wheel 10a, the air is inserted into the inner tire 15a via the second rim valve 14, as shown from the left side of FIG. 12 to the right side of FIG. 12.

As for air insertion procedure, there are two steps. One is the procedure for inflating the air into the inner tire 15a via the second rim valve 14 (the first procedure), and the second is the procedure for inserting the air into the tubeless tire 30 via the first rim valve 13 (the second procedure). Those procedures are the same as the procedures shown in Embodiment 1, so the detailed explanation is omitted here.

Figure 13:
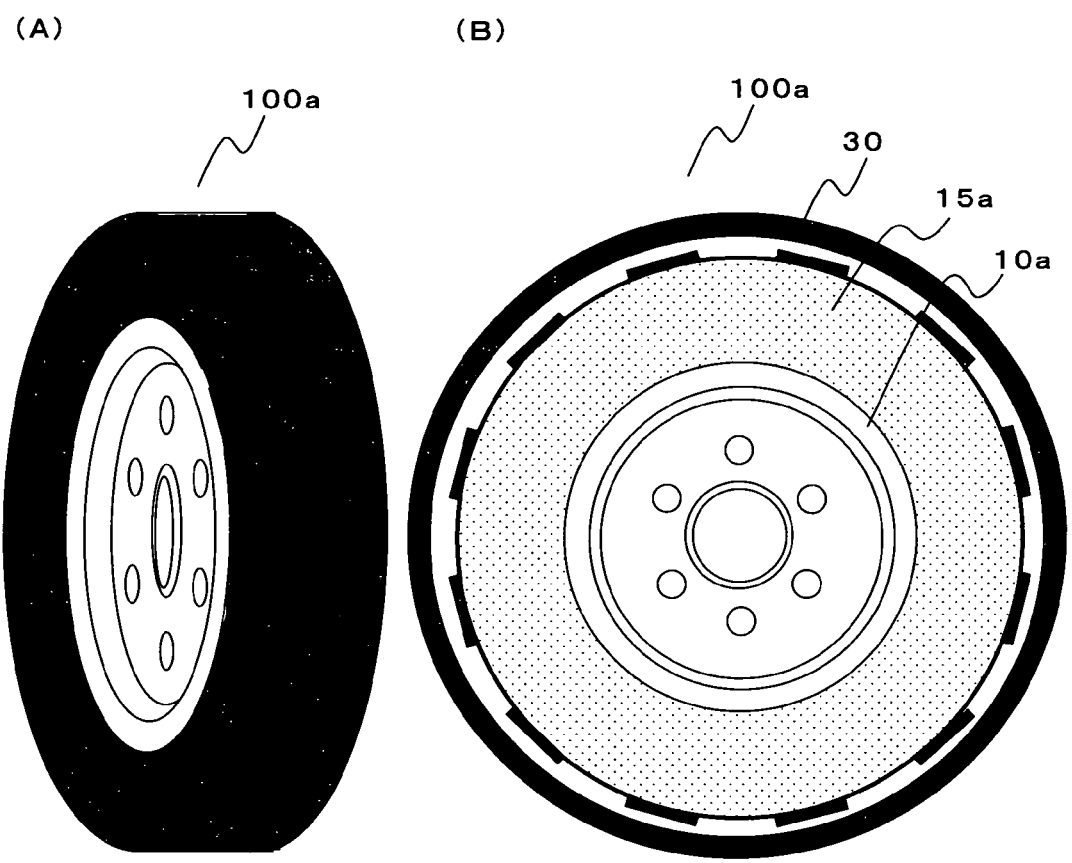
FIG. 13 illustrates a schematic view of the complete dual structure tire wheel of the Embodiment 2.

FIG. 13 illustrates a schematic view of the complete dual structure tire wheel of the Embodiment 2 by inflating air according to the abovementioned procedures. FIG. 13 (A) is a perspective view, and FIG. 13 (B) is a cross-sectional view. As shown in FIG. 13 (B), the inner tire 15a is inflated in the inner space of the tubeless tire 30, so it works as the inner structure of the dual structure tire wheel. This embodiment employs the hard material such as hard rubber on the surface around the inner tire 15a.

Next, the procedure for exchanging the tire is explained as follows. The same as Embodiment 1, in this Embodiment 2, when the outer tubeless tire 30 has worn, only the outer tubeless tire 30 needs to be exchanged.

Figure 14:
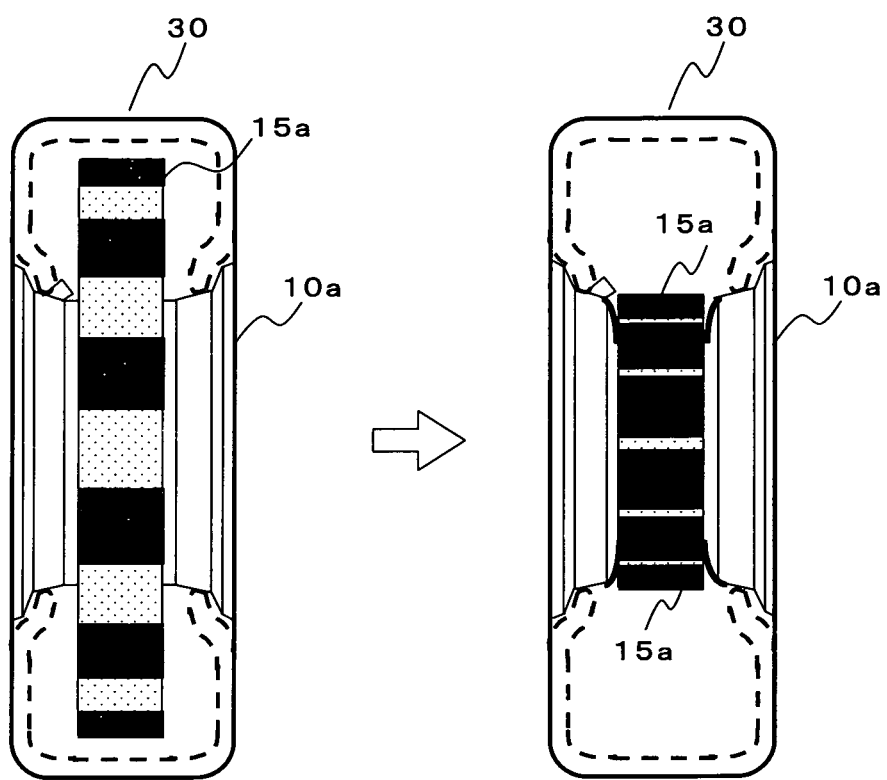
FIG. 14 illustrates a schematic view of the procedure for shrinking the inner tire in the tubeless tire space.

In the first procedure of the outer tubeless tire exchange, as shown in FIG. 14, the air in the inner tire 15a is removed by releasing the second rim valve 14, and the inner tire 15a is shrunk. The inner tire 15a can be contained in the container 12. Next, the air in the outer tubeless tire 30 is removed by releasing the first rim valve 13.

Figure 15:
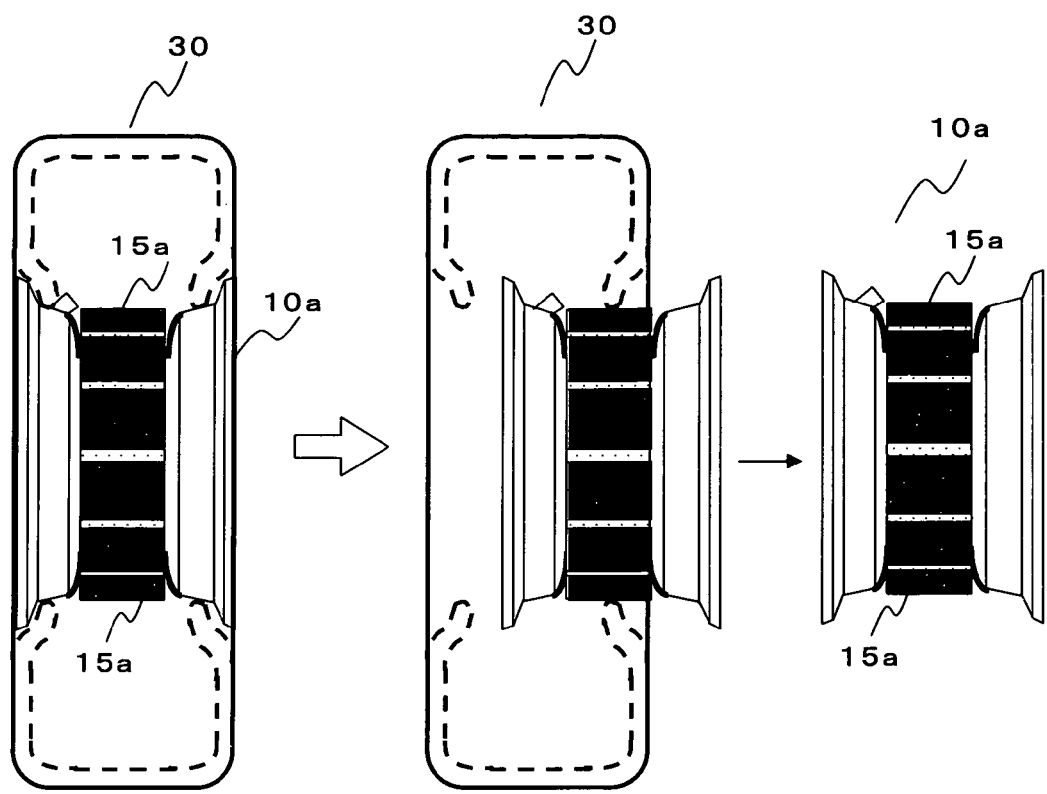
FIG. 15 illustrates a schematic view of the procedure for removing the tubeless tire from the rim wheel.

Next, for the second procedure of the outer tubeless tire exchange, as shown in FIG. 15, the outer tubeless tire 30 is separated by disconnecting the bead part from the bead sheet of the wheel, and the tubeless tire 30 can be removed from the wheel 10a. The inner tire 15a is deflated and the inner tire 15a is not an obstacle to removing the wheel 10a because the diameter of the inner tire 15 becomes small.

By these two procedures, the outer tubeless tire 30 can be taken away from the inner tire 15a and exchanged. On the contrary, the new tubeless tire 30 can be installed according to the FIG. 11 and FIG. 12.

The configuration of the dual structure tire wheel of Embodiment 2 of the present invention is shown as above. The configuration is only one example, and the configuration of the present invention can be modified in various designs.

(Embodiment 3)

The configuration of the dual structure tire wheel of the Embodiment 3 is a configuration that employs the material that has flexibility but elasticity (the reinforced fiber material such as glass fiber material), and the method for inflating the inner tire by inserting air (the third method) is employed.

Figure 16:
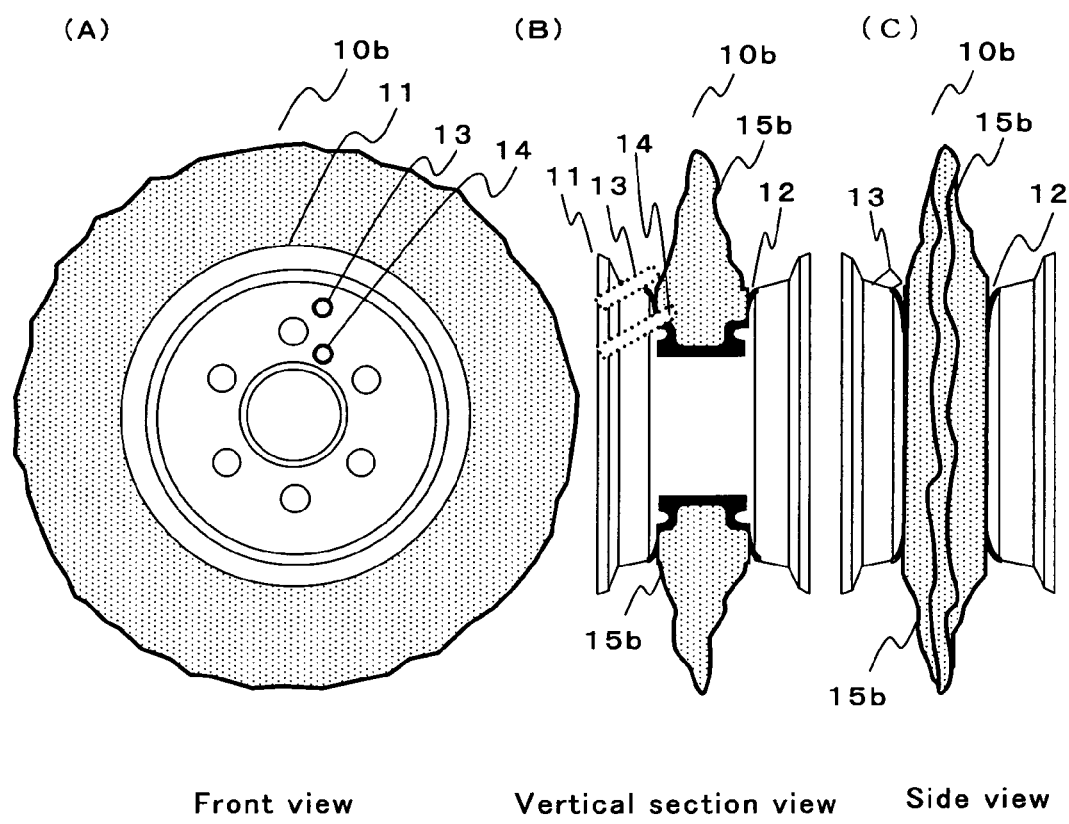
FIG. 16 illustrates a basic structure of the rim wheel of the dual structure tire wheel of the Embodiment 3 according to the present invention.
Figure 17:
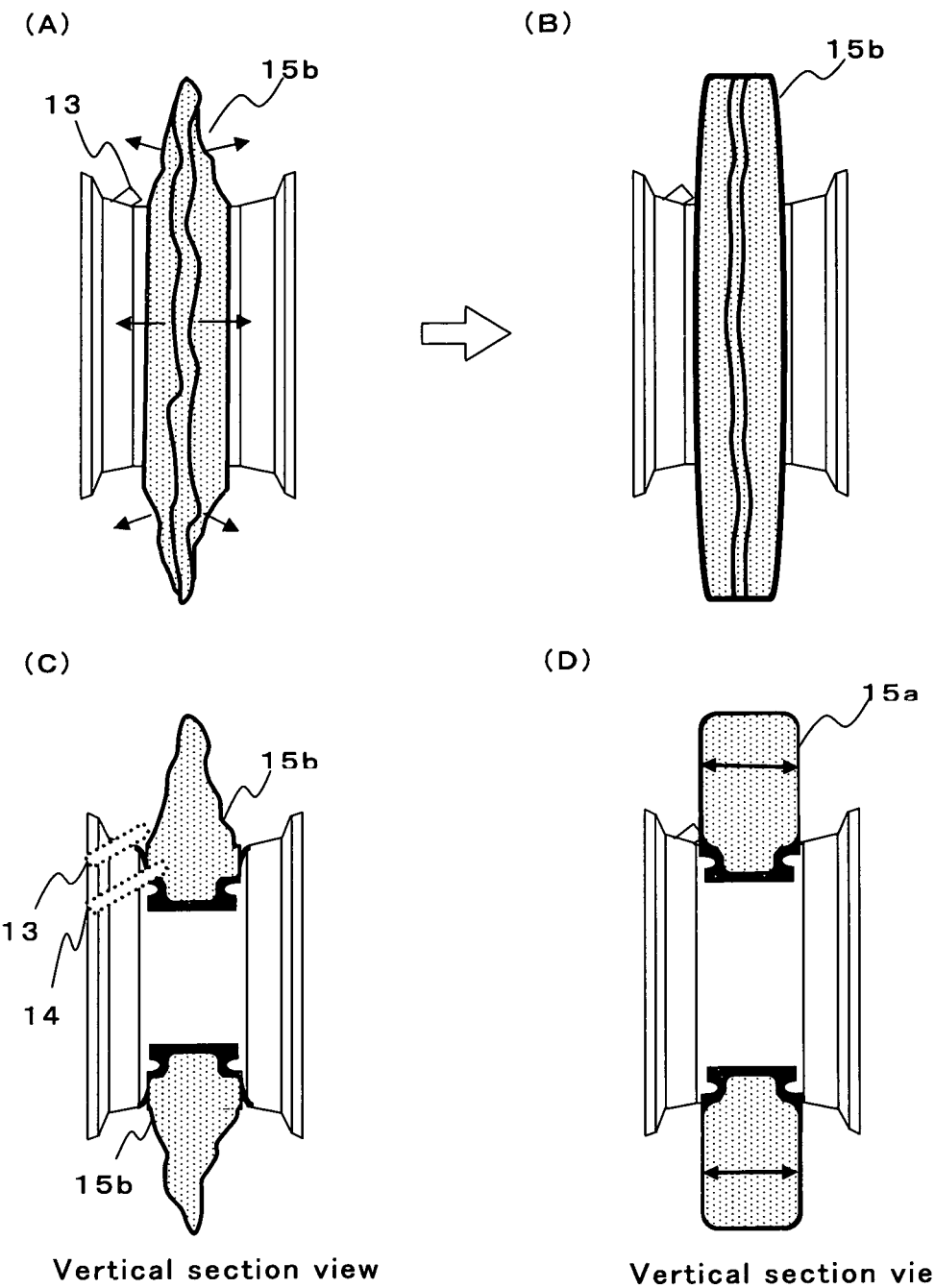
FIG. 17 illustrates a schematic view of the procedure for inflating the inner tire shown in the FIG. 16 of the Embodiment 3.

FIG. 16 illustrates a basic structure of the rim wheel 10b of the dual structure tire wheel of the Embodiment 3, FIG. 17 illustrates a schematic view of the procedure for inflating the inner tire of the rim wheel 10b shown in the FIG. 16. The installing procedure shown in the following description is an example and the description for the detailed procedures such as the procedure for attaching the bead sheet are omitted.

FIG. 16 shows the a schematic view of the rim wheel 10b of the dual structure tire wheel of the present invention. FIG. 16 (A) shows a front view, FIG. 16 (B) shows a vertical cross-sectional view, and FIG. 16 (C) shows a side view. Since the area of the container part 12 of the rim wheel of Embodiment 3 is the same as that of Embodiment 1, a Figure corresponding to FIG. 1 (E) is omitted here.

As shown in FIG. 16 (A) to FIG. 16 (C), the wheel 10a of Embodiment 3 comprises a flange 11, a container 12, a first rim valve 13 for adjusting the air pressure of the tubeless tire 30 installed on the wheel 10b, a second rim valve 14 for adjusting the air pressure of the inner tire 15b and an inner tire 15b the same as Embodiment 1 and Embodiment 2. The function and the structure of the flange 11, the container 12, the first rim valve 13 and the second rim valve 14 are the same as those shown in Embodiment 1 and Embodiment 2.

The inner tire 15b of the Embodiment 3 employs the reinforced fiber material that has flexibility but elasticity such as glass fiber material, and it can be folded and inflated. The inner tire 15b is airtight when it is inflated. In case of the reinforced fiber material such as glass fiber, it is preferable that the synthetic chemical material such as rubber material is applied to the reverse side and the bottom side for making the inner space of the inner tire 15b airtight.

When the inner tire 15b is in a deflated status, it becomes flexible like cloth. When the inner tire 15b is in an inflated status, it becomes the inner structure of the dual structure tire wheel as the run flat tire.

The method for attaching and fixing the inner tire 15b to the wheel 10b, the same as Embodiment 1, are as shown in FIG. 16(B). The bottom part of the inner tire 15b is made of thick reinforced rubber material, and the shape of the bottom part of the inner tire 15b is fitted and fixed for the shape of the bottom and side of the container 12. The inner tire is caught in the bottom part of the container 12, and the inner tire is not separated from the container 12 even if the centrifugal force is applied.

FIG. 17 illustrates a schematic view of the procedure for inflating the inner tire 15b.

As shown in the left side of FIG. 17, the inner tire 15b is in the deflated status. The right side of FIG. 17 shows the inner tire 15b in the inflation status by air insertion via the second rim valve 14. With the inner tire 15b in the inflated status, the diameter is larger than that of the edge of the flange 11, and it can work as the inner structure of the dual structure tire wheel.

Figure 18:
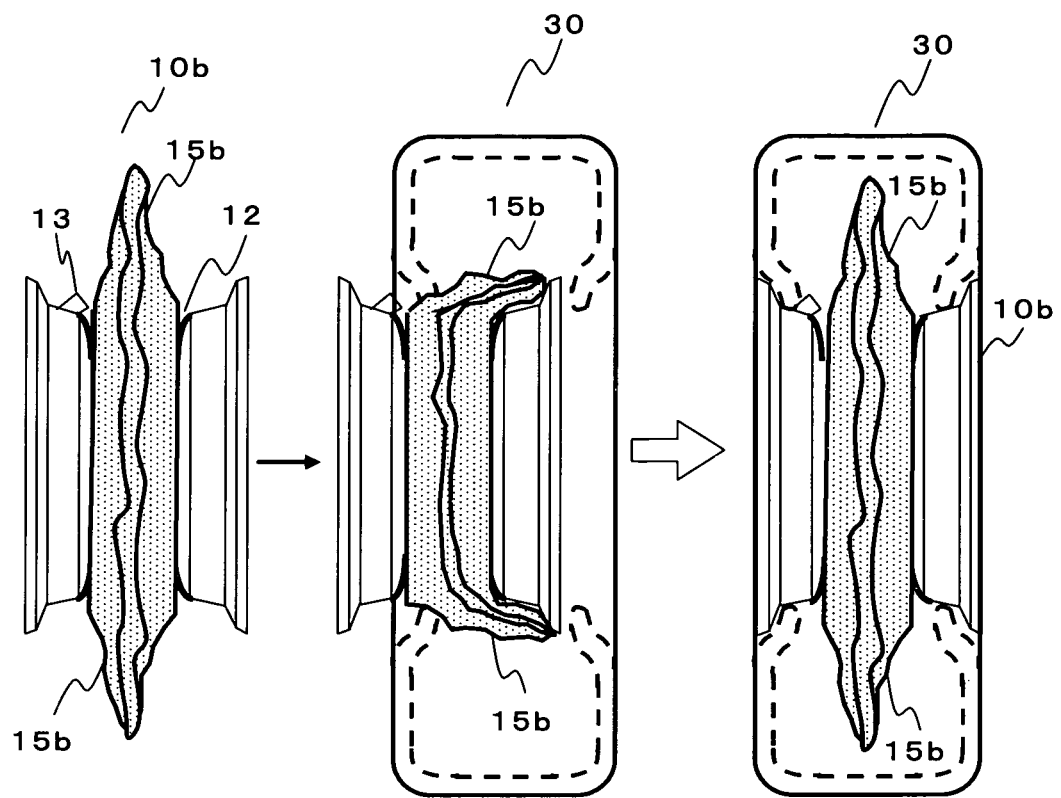
FIG. 18 illustrates a schematic view of the procedure for installing the tubeless tire around the rim wheel of the Embodiment 3.
Figure 19:
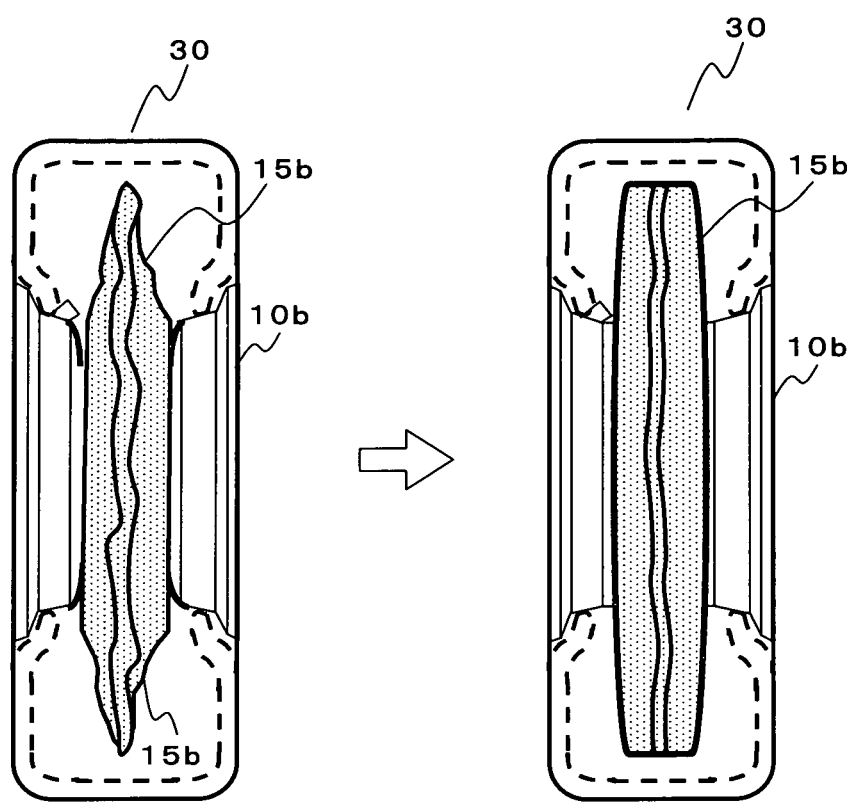
FIG. 19 illustrates a schematic view of the procedure for inflating the inner tire as the inner structure in the tubeless tire space.

FIG. 18 and FIG. 19 illustrate the schematic views of the procedure for installing the tubeless tire 30 around the rim wheel 10b and the inner tire 15b works as the inner structure for the dual structure tire wheel. In the first procedure for installing the tubeless tire 30 to the rim wheel 10b, as shown from the left side of FIG. 18 to the right side of FIG. 18, the tubeless tire 30 goes through and covers the wheel 10b. The bead part of the tubeless tire 30 (not shown in Figure) is installed to the bead sheet of the wheel 10b (not shown in Figure) by the conventional method (the detailed procedure is not shown in Figure). The inner tire 15b is in the flexible status. There is a space around the rim wheel 10b because the diameter of the container 12 of the rim wheel 10b is smaller than that of the center hole of the tubeless tire 30, and the inner tire 15b can be contained in the space. As shown in the right side of FIG. 18, tubeless tire 30 can go through and covers the wheel 10b and the inner tire 15b. After the inner tire 15b is in the tubeless tire inner space, the conventional procedure for installing the tubeless tire to the rim wheel 10b can be applied.

After the tubeless tire 30 goes through and covers the wheel 10b, the air is inserted into the inner tire 15b via the second rim valve 14, as shown from the left side of FIG. 19 to the right side of FIG. 19.

As for air insertion procedure, there are two steps of procedures. One is the procedure for inflating the air into the inner tire 15b via the second rim valve 14 (the first procedure), and the second is the procedure for inserting the air into the tubeless tire 30 via the first rim valve 13 (the second procedure). Those procedures are the same as the procedures shown in Embodiment 1, so the detailed explanation is omitted here.

Figure 20:
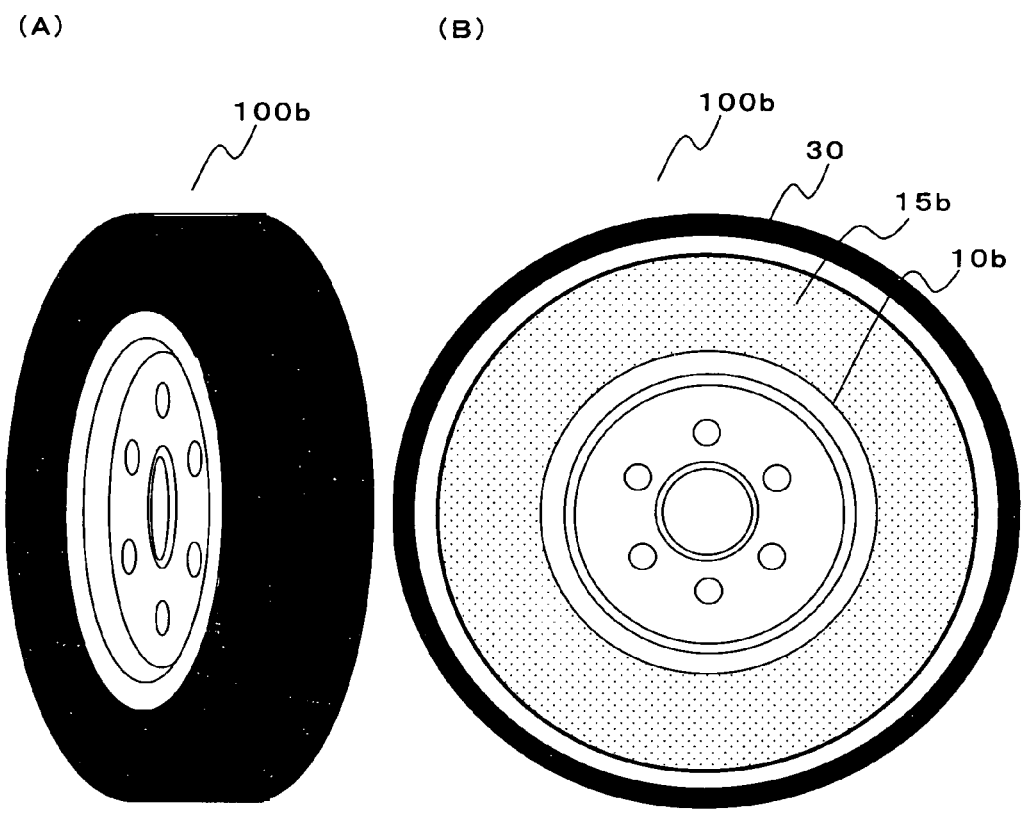
FIG. 20 illustrates a schematic view of the complete dual structure tire wheel of the Embodiment 3.

FIG. 20 illustrates a schematic view of the complete dual structure tire wheel of the Embodiment 3 by inflating air according to the abovementioned procedures. FIG. 20 (A) is a perspective view, and FIG. 20 (B) is a cross-sectional view. As shown in FIG. 20 (B), the inner tire 15b is inflated in the inner space of the tubeless tire 30, and it works as the inner structure of the dual structure tire wheel.

Next, the procedure for exchanging the tire is explained as follows. The same as Embodiment 1, in this Embodiment 3, when the outer tubeless tire 30 has worn, only the outer tubeless tire 30 need be exchanged.

Figure 21:
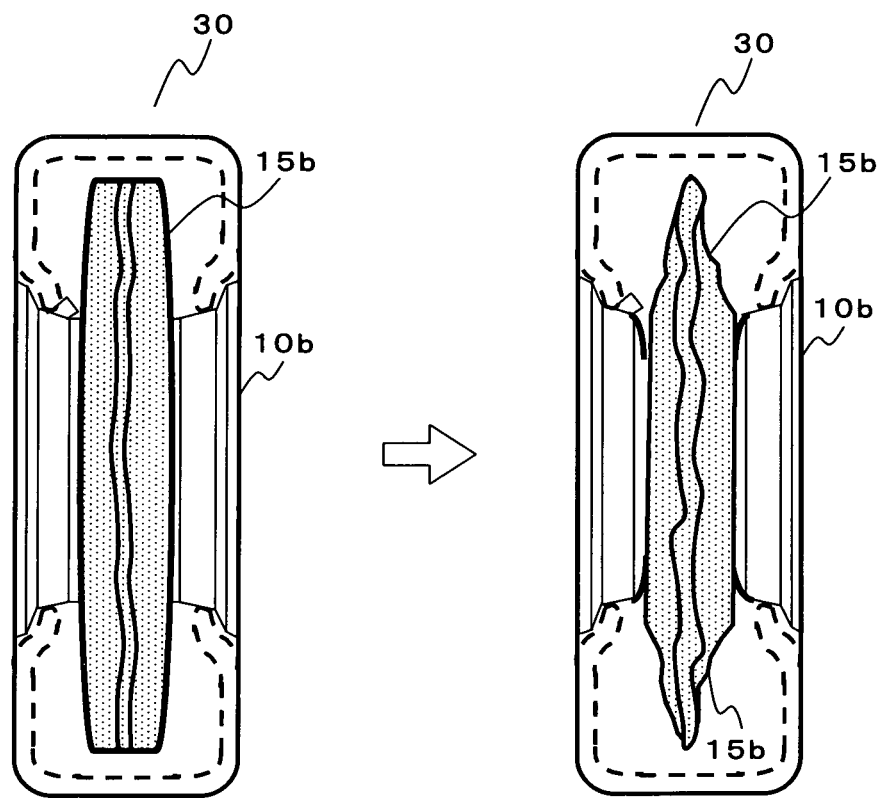
FIG. 21 illustrates a schematic view of the procedure for shrinking the inner tire in the tubeless tire space.

In the first procedure of the outer tubeless tire exchange, as shown in FIG. 21, the air in the inner tire 15b is removed by releasing the second rim valve 14, and the inner tire 15b is shrunk. Next, the air in the outer tubeless tire 30 is removed by releasing the first rim valve 13.

Figure 22:
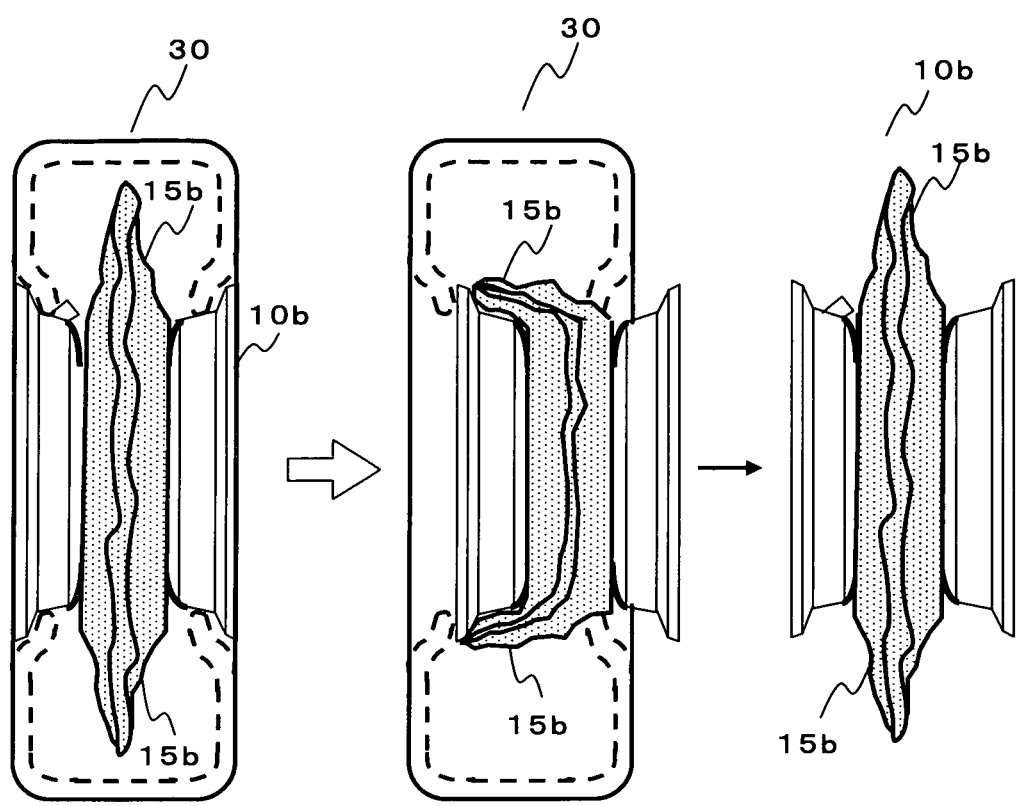
FIG. 22 illustrates a schematic view of the procedure for removing the tubeless tire from the rim wheel.

Next, in the second procedure of the outer tubeless tire exchange, as shown in FIG. 22, the outer tubeless tire 30 is separated by disconnecting the bead part from the bead sheet of the wheel, and the tubeless tire 30 can be removed from the wheel 10b. The inner tire 15b is in the deflated status and in the flexible status. There is the space around the rim wheel 10b because the diameter of the container 12 of the rim wheel 10b is smaller than that of the center hole of the tubeless tire 30, so the inner tire 15b can be contained in the space and the rim wheel 10b can be taken away.

By these two procedures, the outer tubeless tire 30 can be taken away from the inner tire 15b and exchanged. Then the new tubeless tire 30 can be installed according to the FIG. 18 and FIG. 19.

The configuration of the dual structure tire wheel of Embodiment 3 of the present invention is shown as above. The configuration is only one example, the configuration of the present invention can be modified in various designs.

(Embodiment 4)

The configuration of the dual structure tire wheel of the Embodiment 4 is a configuration of the second invention of the dual structure tire wheel.

Figure 23:
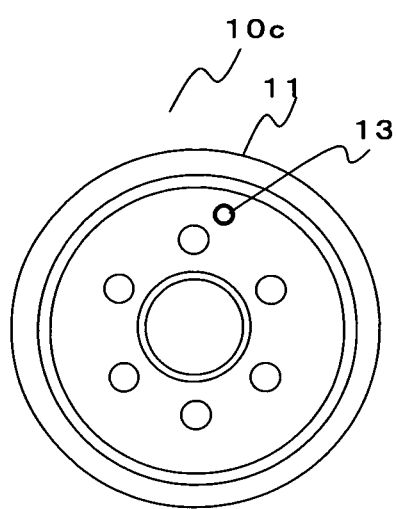
FIG. 23 illustrates a basic structure of the rim wheel of the dual structure tire wheel of the Embodiment 4 according to the present invention.
Figure 23:
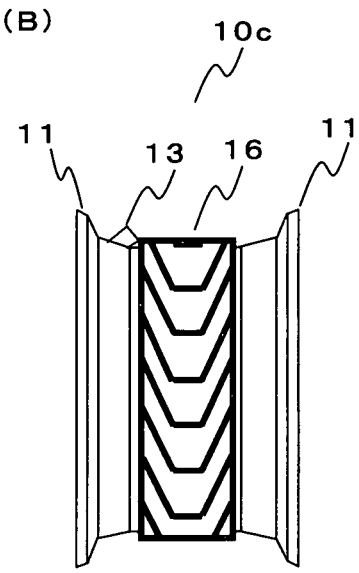
Figure 24:
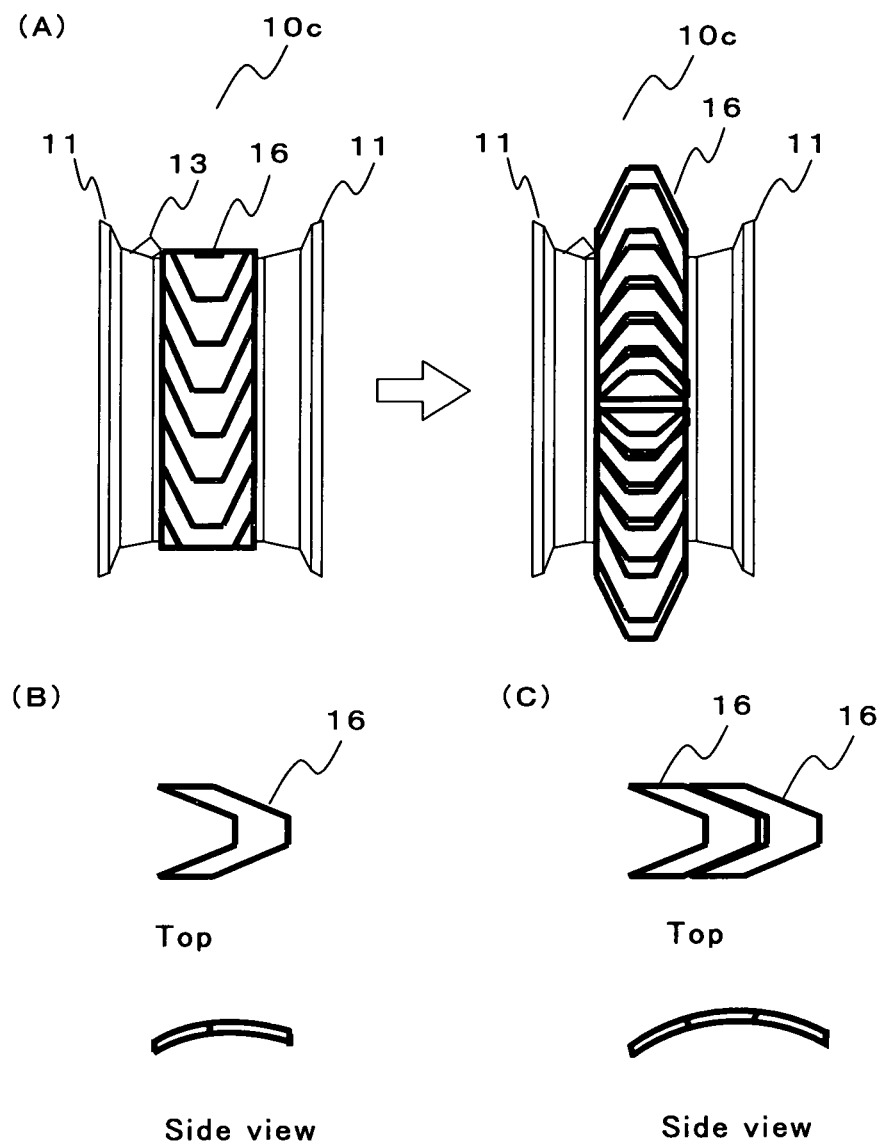
FIG. 24 illustrates a schematic view of the procedure for unfolding the inner plate shown in the FIG. 23 of the Embodiment 4.

FIG. 23 illustrates a basic structure of the rim wheel 10c of the dual structure tire wheel. FIG. 24 illustrates a schematic view of the procedure for unfolding the inner plate of the rim wheel 10c shown in FIG. 23. The description for the detailed procedures such as procedure for attaching the bead sheet are omitted. In addition, the tubeless tire 30 installing procedure and the inner plate unfolding procedure in the following description are only examples. FIG. 24 shows a schematic view of the rim wheel of the dual structure tire wheel of Embodiment 4. FIG. 23 (A) shows a front view, and FIG. 23 (B) shows a vertical cross-sectional view.

As shown in FIG. 23, the wheel 10c of Embodiment 4 comprises a flange 11, a first rim valve 13 for adjusting the air pressure of the tubeless tire 30, and inner plates 16. The function and the structure of the flange 11 and the first rim valve 13 are the same as those shown in Embodiment 1. In FIG. 23 as shown below, other detailed objects such as objects included in the angle adjusting mechanism for adjusting the angle of the inner plate 16 and the wheel 10c are omitted here.

The inner plate 16 is a plate structure whose angle relative to the well of the wheel 10c can be adjusted. Plural inner plates are arrayed along the well of the wheel 10c.

When the installation angle of the inner plate 16 is adjusted so the inner plate modules are set down parallel to the well bottom of the rim wheel 10c, the diameter of the inner plate modules 16 is smaller than that of the edge of the rim flange 11. When the installation angle of the inner plate module 16 is adjusted so the inner plate modules are set up against the well bottom of the rim wheel 10c, the diameter of the inner plate modules increases and is larger than that of the rim flange 11.

The left side of FIG. 24 (A) shows the inner plate 16 set down parallel to the well bottom of the rim wheel 10c. The right side of FIG. 24 (A) shows the inner plate 16 set up against the well bottom of the rim wheel 10c and expanded in diameter.

As shown in the left side of FIG. 24 (A), the inner plate 16 set down parallel to the well bottom of the rim wheel 10c. The diameter of the inner plate 16 is smaller than that of the flange 11. As shown in the right side of FIG. 24 (B), the installation angle of the inner plate 16 to the wheel can be adjusted by the angle adjusting mechanism (not shown in Figure). Therefore, as shown in the right side of FIG. 24 (A), the inner plate 16 can keep the installation angle set up against to the well bottom of the wheel 10c. Each inner plate 16 can work as an inner structure of the dual structure tire wheel because the diameter of the inner plate 16 is larger than that of the flange 11 of the rim wheel 10c.

It is preferable that the shape of the inner plate 16 is modified as follows.

The first modification is that the shape of the inner plate has curve along the round shape of the rim wheel 10c. According to the curve shape, when the inner plate 16 is set down along to the surface of the rim wheel 10c, the diameter of the inner plate can be small.

The second modification is that the inner plate 16 has a projection shape at one side of the inner plate module and a dent shape at the other side of the inner plate module shape as shown in the plan view figure of FIG. 24 (B). With the shape of the inner plate 16 as shown in FIG. 24 (B), the projection shape of one inner plate module corresponds to the dent shape of the neighboring inner plate module. Each inner plate 16 can be arrayed along the rim wheel 10c where the projection shape corresponds to the dent shape of the neighboring inner plate, so there is no overlap bump and the outer surface of inner plates 16 becomes a round shape as shown in FIG. 24 (C), and each inner plate can be set down smoothly. By this modification, the length of the inner plate (length along to the rim wheel) can be made long and each inner plate can be installed closely. The number of the inner plate 16 installed to the rim wheel becomes large. If the length of the inner plate (length along to the rim wheel) is long, the diameter of the inner structure configured by the inner plates will be large by adjusting the installation angle relative to the rim wheel. In addition, if the number of the inner plate 16 installed to the rim wheel is large, the structural strength of the inner structure of the dual structure tire wheel will be enhanced.

For the material of the inner plate 16, light weight metal, light weight hard plastic, and light weight hard rubber can be employed.

Figure 25:
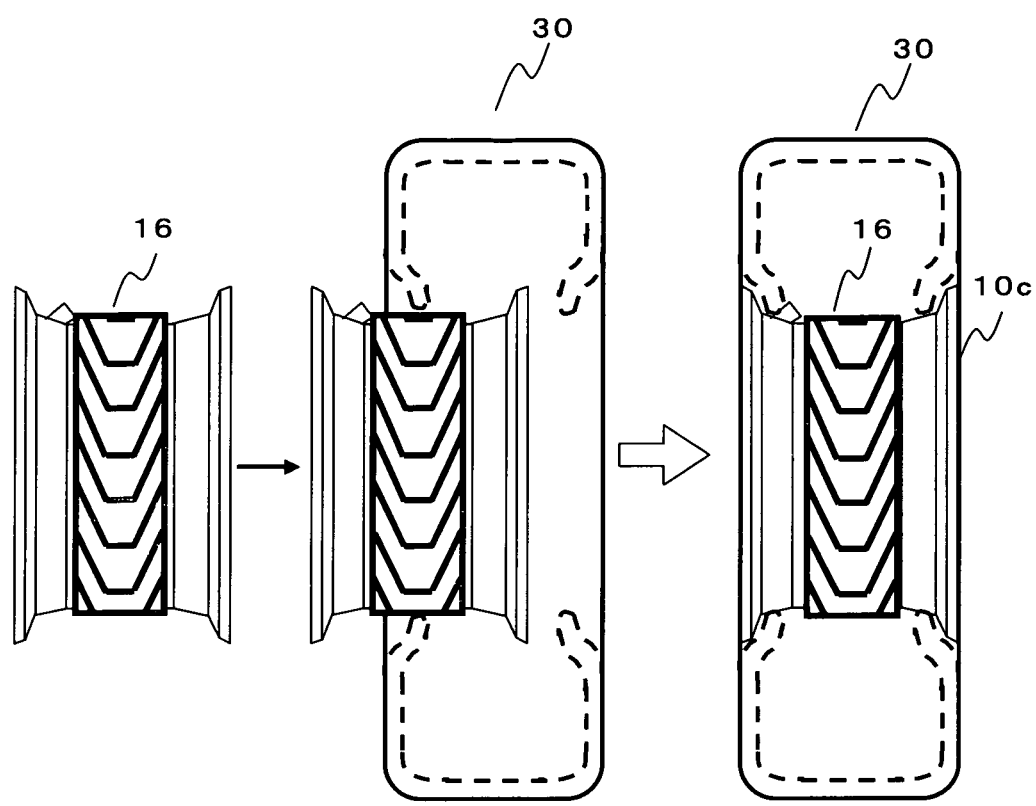
FIG. 25 illustrates a schematic view of the procedure for installing the tubeless tire around the rim wheel of the Embodiment 4.
Figure 26:
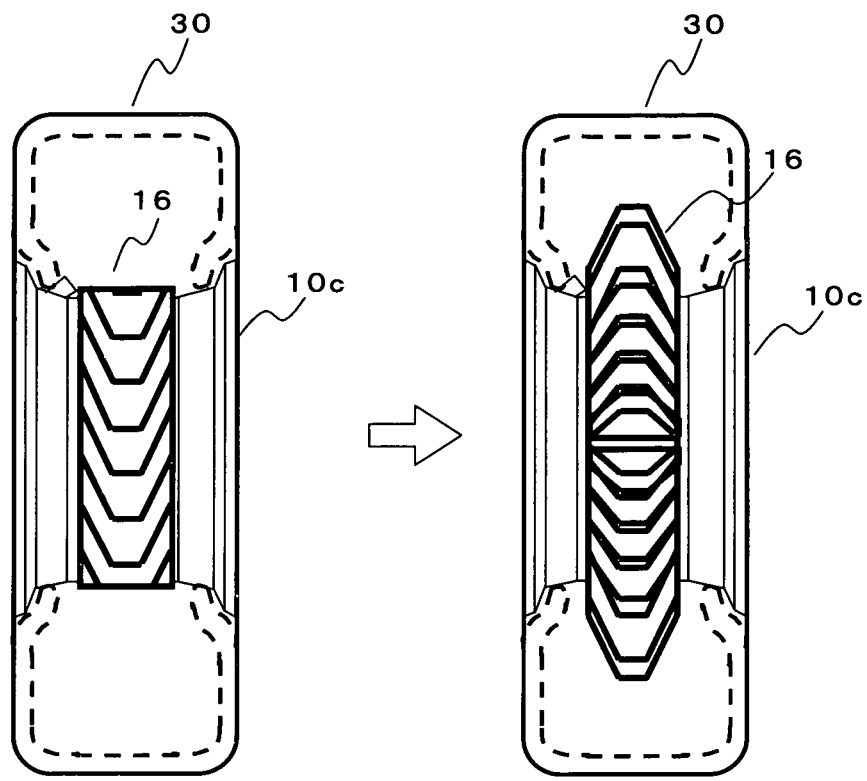
FIG. 26 illustrates a schematic view of the procedure for unfolding the inner plate as the inner structure in the tubeless tire space.

FIG. 25 illustrates a schematic view of the procedure for installing the tubeless tire around the rim wheel. FIG. 26 illustrates a schematic view of the procedure for unfolding the inner plate as the inner structure in the tubeless tire space.

In FIG. 25 and FIG. 26, the outline of the tubeless tire 30 is drawn by the solid line, and the cross-sectional view is drawn by the dot line. The inner cross-sectional view is shown for explaining the relationship between the wheel 10c and the tubeless tire 30.

First of all, as shown in the left side in FIG. 25, the tubeless tire 30 goes through and covers the wheel 10c. The bead part of the tubeless tire 30 (not shown in Figure) is installed to the bead sheet of the wheel 10c (not shown in Figure) by the conventional method (the detailed procedure is not shown in Figure). The shape and the structure of the bead part of the tubeless tire 30, the bead sheet of the wheel 10c and flange 11 are the same as the conventional bead part and the conventional wheel.

The installation angle of the inner plate 16 is adjusted along the rim wheel outer surface and the diameter of the inner structure defined by the inner plates becomes small. Each inner plate thus is not an obstacle when the tubeless tire 30 goes to cover the rim wheel 10c so the conventional tubeless tire installation procedure can be applied.

Next, as shown from the left side of FIG. 26 to the right side of FIG. 26, the diameter of the inner structure can be enlarged by adjusting the installation angle of the inner plate 16 to the rim wheel 10c to set up the inner plates in the inner space of the tubeless tire 30. The diameter of the inner structure configured by the inner plate 16 is an appropriate diameter for working as the inner structure of the run flat tire.

Next, the tubeless tire 30 is inflated up to the predetermined air pressure via the first rim valve 13, it is suitable to drive.

In this case, the angle adjustment of the inner plate 16 does not influence the inner air pressure, regardless of the order between the procedure for adjusting the angle of the inner plate 16 and the procedure for inflating the tubeless tire 30, so the angle of the inner plate 16 can be adjusted after inflating the tubeless tire 30 by inserting the air.

Figure 27:
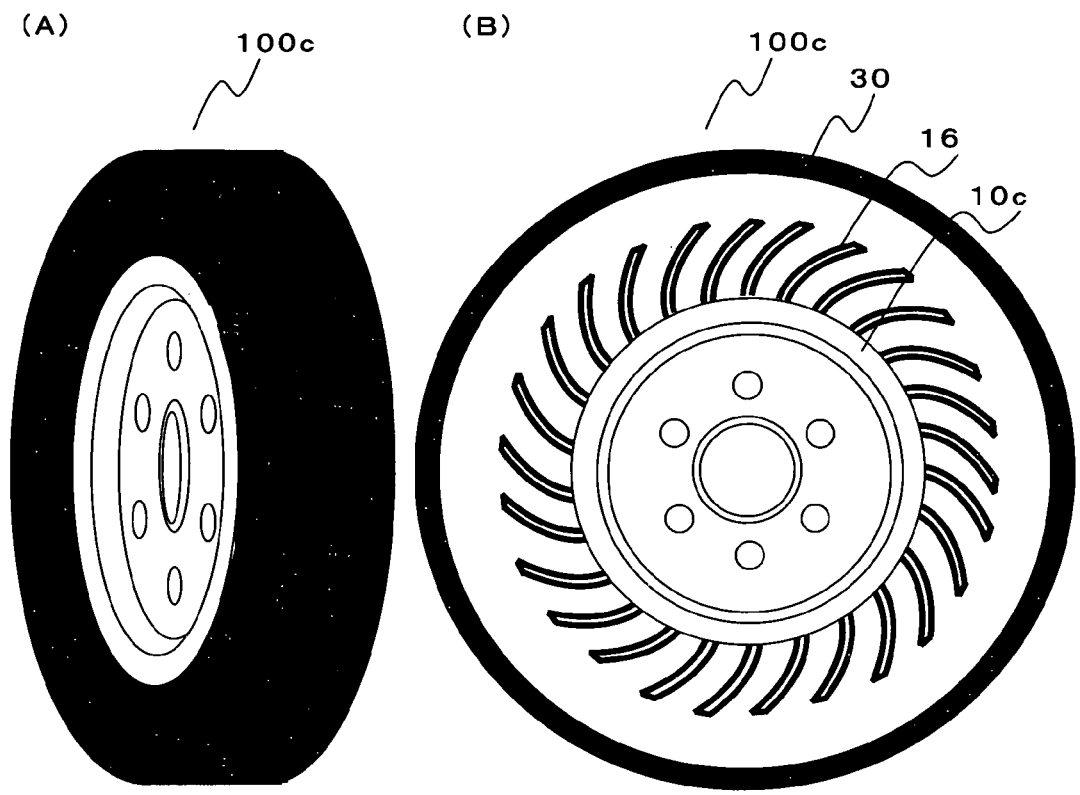
FIG. 27 illustrates a schematic view of the complete dual structure tire wheel of the Embodiment 4.

FIG. 27 illustrates a schematic view of the complete dual structure tire wheel 100c of the Embodiment 4. FIG. 27 (A) is a perspective view, and FIG. 27 (B) is a cross-sectional view. As shown in FIG. 27 (B), the angle of the inner plate 16 is adjusted in the inner space of the tubeless tire 30, and it works as the inner structure of the dual structure tire wheel.

Next, the effect of the present invention when the outer tubeless tire 30 is punctured is explained.

Figure 28:
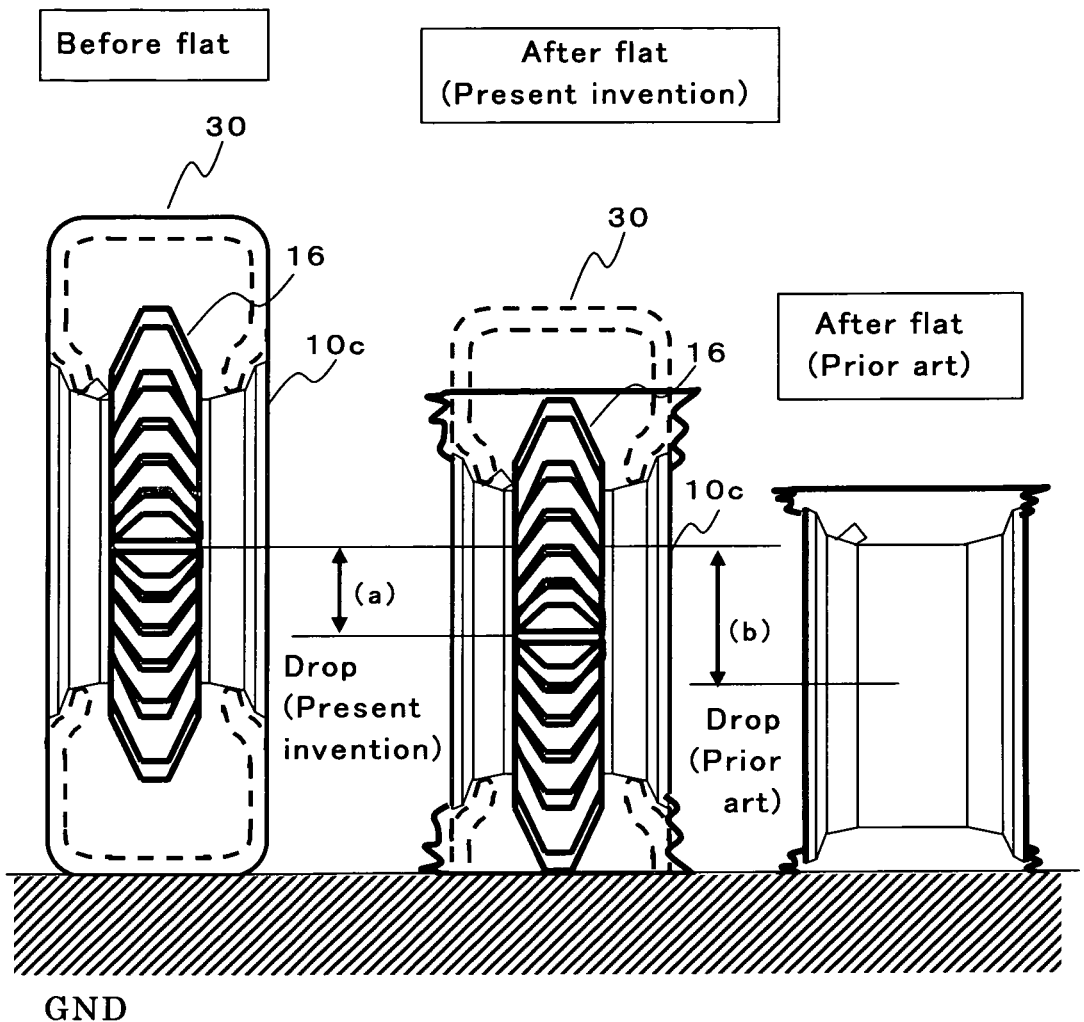
FIG. 28 illustrates a schematic view of the advantageous merit when the dual structure tire wheel of the present invention goes flat.

The left side of FIG. 28 illustrates a schematic view when the tubeless tire 30 is in the normal status, the right side of FIG. 28 illustrates a schematic view when the conventional tubeless tire is punctured, and the center of FIG. 28 illustrates a schematic view when the tire wheel 100c of the present invention is punctured.

When the tubeless tire 30 is punctured, the tubeless tire 30 is burst and the car body drops to some extent because the tubeless tire 30 cannot sustain the weight. Therefore the handling becomes difficult and the danger increases. For the conventional tire wheel, the car body in a moment from the status shown in the left side of the FIG. 28 to the status shown in the right side of the FIG. 28. In the case of the conventional tire wheel, the car body drops a height of "b" in a moment, so the danger level is high. On the contrary, in the case of the present invention, the car body is sustained temporarily by the inner plate 16, and the car body drops in a moment from the status shown in the left side of the FIG. 28 to the status shown in the center of the FIG. 28. In the case of the present invention, the car body drops a height of "a" in a moment. Comparing the height that the car body drops at the time of puncture, it is obvious that the tire wheel of the present invention is safer than the conventional tire wheel because the conventional tire wheel drops a height of "b" and the tire wheel of the present invention drops a height of "a", so the height becomes small.

The diameter of the inner plate 16 can be adjustable. The diameter of the inner plate 16 is adjusted by adjusting the inner plate installation angle to the rim wheel 10c. The diameter of the inner plate 16 means the height of the inner structure of the dual structure tire wheel, the height of the inner structure can be adjusted appropriately by adjusting the inner plate 16 installation angle according to the car type and car use.

The structural strength of the inner plate 16 required when the tire punctures is explained as follows. When the outer tubeless tire 30 punctures, it is not stripped away in a moment and it remains around the wheel temporarily. In this status, the inner plate 16 sustains the car weight temporarily and works as the inner structure. Therefore, the car can keep on running for a while until the car stops as if it still has the tubeless tires by the outer tubeless tire 30 and the inner plate 16. The dual structure tire wheel of the present invention aims at this effect.

Next, the procedure for exchanging the tire is explained as follows. According to the present invention, when the outer tubeless tire 30 has worn, only the outer tubeless tire 30 need be exchanged. The outer tubeless tire 30 and the inner plate 16 are separated, so the outer tubeless tire 30 can be exchanged independently.

Figure 29:
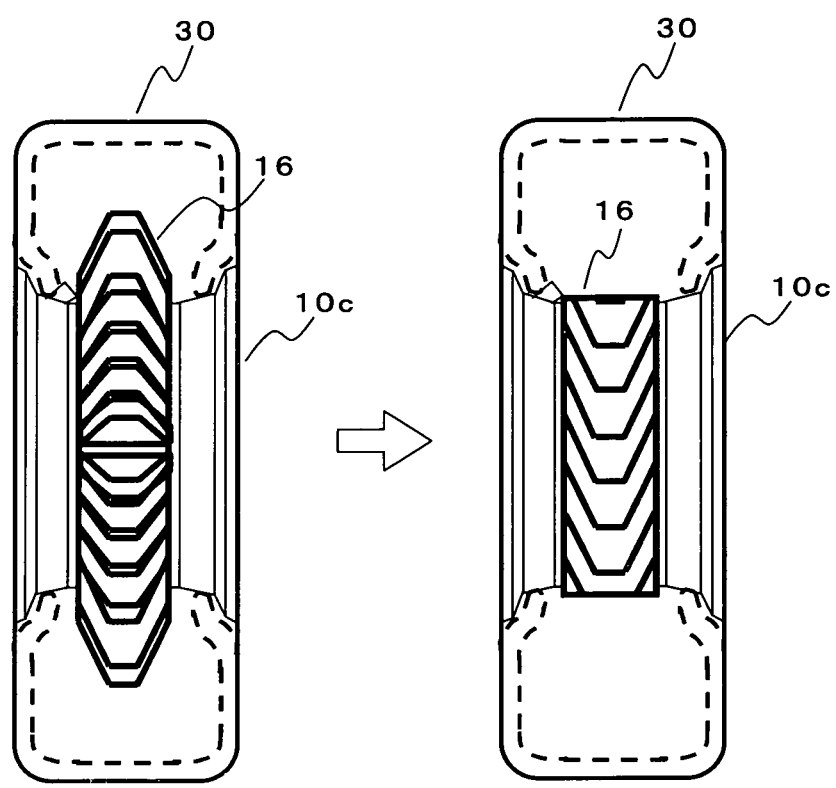
FIG. 29 illustrates a schematic view of the procedure for folding the inner plate in the tubeless tire space.

In the first procedure of the outer tubeless tire exchange, as shown in FIG. 29, the angle of the inner plate 16 is adjusted to be set down along the rim wheel, and the air of the tubeless tire 30 is removed by releasing the first rim valve 13. The order of the procedure for adjusting the inner plate angle and the procedure for releasing the first rim valve 13 can be exchangeable.

Figure 30:
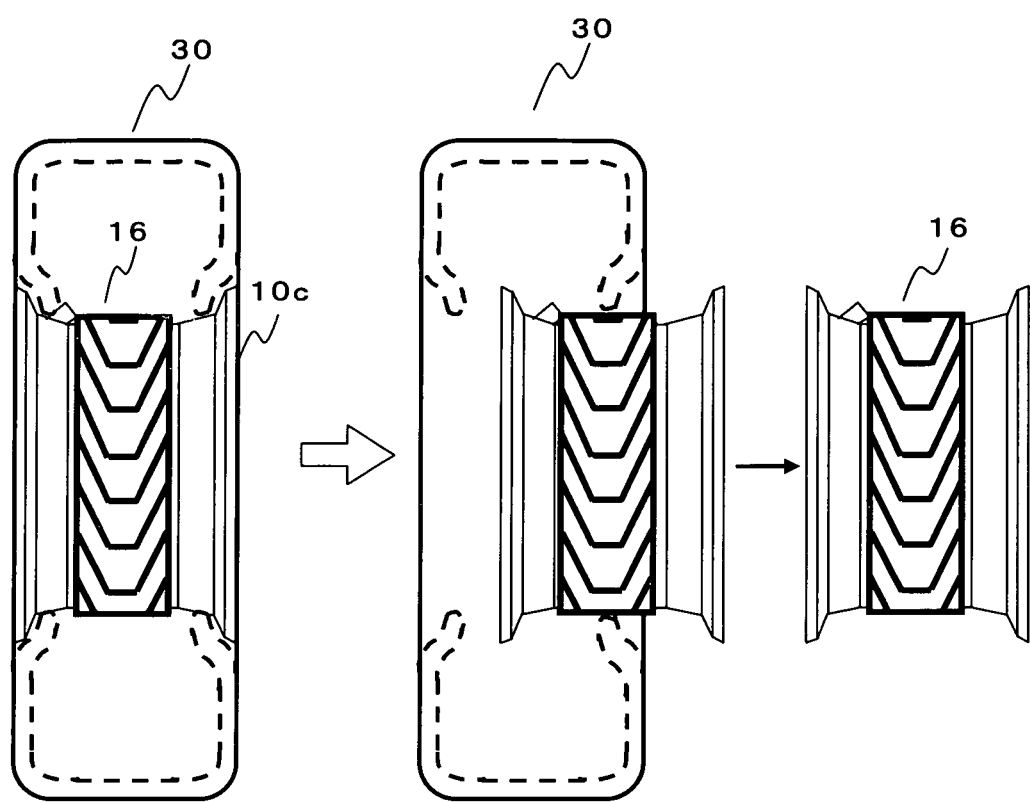
FIG. 30 illustrates a schematic view of the procedure for removing the tubeless tire from the rim wheel.
Figure 31:
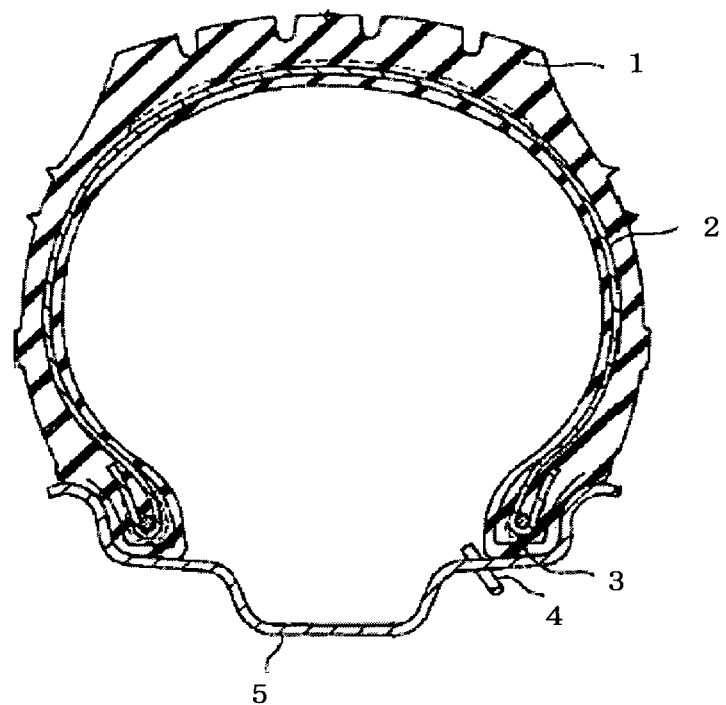
FIG. 31 illustrates a basic structure of the rim wheel of the conventional tire wheel in the prior art.

Next, in the second procedure of the outer tubeless tire exchange, as shown in FIG. 30, the outer tubeless tire 30 is separated by disconnecting the bead part from the bead sheet of the wheel, the tubeless tire 30 can be removed from the wheel 10c. During this procedure, the inner plate 16 is not an obstacle to pulling out the rim wheel because the diameter of the inner tire 15 becomes small.

By these two procedures, the outer tubeless tire 30 can be take away from the rim wheel and exchanged. The new tubeless tire 30 can be installed according to the FIG. 25 and FIG. 26.

The configuration of the dual structure tire wheel of Embodiment 4 of the present invention is shown as above. The configuration is only one example, and the configuration of the present invention can be modified in various designs.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

The invention claimed is:

1. A dual structure tire wheel comprising:
a rim wheel and an outer tubeless tire,
wherein the rim wheel comprises
   a flange;
   a bead sheet for connecting a bead part of the outer tubeless tire;
   a well;
   a container defined in a space between a surface of the well and the edge of the rim flange, the container having a recess in its side wall;
   an inflatable inner tire contained in the container in a deflated state and protruding from the container in an inflated state, the inner tire having a projection in a radially inner part;
   a first rim valve for adjusting the air pressure of the outer tubeless tire; and
   a second rim valve for adjusting the air pressure of the inner tire;
   wherein the radially inner part of the inner tire is made of a rubber material and the projection of the inner tire fits firmly into the recess of the container so that displacement of the inner tire from the well by centrifugal force caused by the tire rotation is avoided.

2. The dual structure tire wheel according to claim 1, wherein the inner tire has an inflation portion having plasticity, and the diameter of the inner tire is larger than that of the flange of the rim wheel when the inner tire is inflated in the tubeless tire inner space by inserting the air into the inner tire to the appropriate air pressure via the second rim valve.

3. The dual structure tire wheel according to claim 1, wherein the inner tire material comprises a material selected from the group consisting of a rubber, a plastic, a textile, a combination of these materials and other additive for structural reinforcement.

4. The dual structure tire wheel according to claim 2, wherein the inner tire material comprises a material selected from the group consisting of a rubber, a plastic, a textile, a combination of these materials and other additive for structural reinforcement.

5. A rim wheel for the dual structure tire wheel according to claim 1.

6. A rim wheel for the dual structure tire wheel according to claim 2.

7. A rim wheel for the dual structure tire wheel according to claim 3.

8. A rim wheel for the dual structure tire wheel according to claim 4.

* * * * *